(12) United States Patent
Doi et al.

(10) Patent No.: US 7,796,637 B2
(45) Date of Patent: Sep. 14, 2010

(54) RADIO COMMUNICATION METHOD AND RADIO COMMUNICATION DEVICE

(75) Inventors: Hiroshi Doi, Kanagawa (JP); Masahiro Mimura, Tokyo (JP); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1174 days.

(21) Appl. No.: 10/577,628

(22) PCT Filed: Jun. 15, 2005

(86) PCT No.: PCT/JP2005/010927
§ 371 (c)(1),
(2), (4) Date: Apr. 28, 2006

(87) PCT Pub. No.: WO2005/125106
PCT Pub. Date: Dec. 29, 2005

(65) Prior Publication Data
US 2008/0279214 A1 Nov. 13, 2008

(30) Foreign Application Priority Data
Jun. 17, 2004 (JP) ............................. 2004-179276

(51) Int. Cl.
*H04L 12/413* (2006.01)
*H04L 12/42* (2006.01)
*H04L 12/43* (2006.01)
(52) U.S. Cl. .................... 370/445; 370/449; 370/458
(58) Field of Classification Search ............... 370/345, 370/346, 347, 348, 349, 445, 447, 448, 449, 370/450, 458, 461
See application file for complete search history.

(56) References Cited

U.S. PATENT DOCUMENTS 4,503,533 A * 3/1985 Tobagi et al. .............. 370/445

(Continued)

FOREIGN PATENT DOCUMENTS

JP 2003-229869 A 8/2003

(Continued)

OTHER PUBLICATIONS

Akimitsu Kanzaki et al., "On TDMA Slot Assignment Protocol Considering the Change of Network Topology in Ad Hoc Networks", Information Processing Society of Japan SIG Technical Report, Jan. 29, 2004, vol. 2004, No. 9, pp. 43 to 48.

(Continued)

*Primary Examiner*—Seema S. Rao
*Assistant Examiner*—Xavier Szewai Wong
(74) *Attorney, Agent, or Firm*—RatnerPrestia

(57) ABSTRACT

A radio communication device includes a beacon reception unit extracting a frame from a received beacon and a frame judgment unit judging whether the extracted frame is one requiring data transmission/reception or one giving notice of a collision with a beacon of another network, a frame constructing unit used when the frame judgment unit has judged that the frame is a collision notification, generating a frame for relaying the collision notification and a movement notification to a new beacon transmission period, and a beacon transmission instruction unit instructing transmission of the frame at the beacon transmission timing. Accordingly, since these notifications can be relayed, all radio communication devices of the same network can move to a new beacon transmission period while avoiding a collision with a beacon from a radio communication device of another network.

29 Claims, 18 Drawing Sheets

U.S. PATENT DOCUMENTS

| | | | |
|---|---|---|---|
| 5,339,313 A * | 8/1994 | Ben-Michael et al. | 370/230 |
| 5,652,752 A * | 7/1997 | Suzuki et al. | 370/330 |
| 6,061,737 A * | 5/2000 | Fite et al. | 709/243 |
| 6,754,250 B2 * | 6/2004 | Haartsen | 375/132 |
| 6,781,978 B1 * | 8/2004 | Xie et al. | 370/338 |
| 6,785,510 B2 * | 8/2004 | Larsen | 455/11.1 |
| 6,791,996 B1 * | 9/2004 | Watanabe et al. | 370/447 |
| 6,963,747 B1 * | 11/2005 | Elliott | 455/450 |
| 7,558,258 B2 * | 7/2009 | Doi et al. | 370/376 |
| 7,613,202 B2 * | 11/2009 | Doi et al. | 370/443 |
| 2002/0080768 A1 * | 6/2002 | Garcia-Luna-Aceves et al. | 370/349 |
| 2004/0264425 A1 * | 12/2004 | Nishikawa | 370/338 |
| 2005/0249170 A1 * | 11/2005 | Salokannel et al. | 370/338 |

FOREIGN PATENT DOCUMENTS

| | | |
|---|---|---|
| JP | 2004-40645 A | 2/2004 |
| JP | 2005-151525 A | 6/2005 |
| WO | WO 03/047175 A1 | 6/2003 |

OTHER PUBLICATIONS

International Search Report for PCT/JP2005/010927, dated Sep. 6, 2005.

* cited by examiner

Fig.5A

| SOURCE DEVICE ID | BEACON GROUP ID | MANAGEMENT INFORMATION TYPE | OFFSET TIME | LIFETIME |
|---|---|---|---|---|
| A1 | 1 | 0 | T_1 | 254 |
| A2 | 1 | 1 | T_1 | 253 |
| A3 | 2 | 1 | T_2 | 250 |
| A4 | 3 | 3 | T_3 | 250 |
| N/A | 4 | NORMAL BEACON | T_4 | N/A |

| DEVICE ID | SLOT POSITION |
|---|---|
| A1 | 4 |
| A2 | 7 |
| A3 | 1 |
| A4 | 10 |

511 / 512

RADIO COMMUNICATION METHOD AND RADIO COMMUNICATION DEVICE

THIS APPLICATION IS A U.S. NATIONAL PHASE APPLICATION OF PCT INTERNATIONAL APPLICATION PCT/JP2005/010927.

TECHNICAL FIELD

The invention relates to a radio communication method and a radio communication device when performing ad hoc communication in a radio communication network.

BACKGROUND ART

Conventionally, as the above radio communication method and the radio communication device, there are ones, for example, disclosed in JP-A-2003-229869. FIG. 17 shows the radio communication method described in the JP-A-2003-229869, which shows a radio communication method in which radio communication devices directly make communication with each other without disposing a control station in a radio network.

In FIG. 17, a radio communication device 1702 sets a notification cycle of management information at a predetermined time interval and transmits management information in which reception timing information indicating a start position for receiving information on the radio communication device 1702, reception window information, and reception cycle information are written (T1). Another radio communication device 1701 which was able to receive the management information stores the reception timing, the reception window and the reception cycle, associating them with the communication device number of the radio communication device 1702. Then, when the radio communication device 1701 transmits information, it determines the reception start position in the corresponding radio communication device 1702 based on the reception timing, the reception window and the reception cycle of the correspondent node, and transmits the information at the timing of the reception start position.

The management information is exchanged between all radio communication devices in a management information exchange area by transmitting beacons.

However, by the movement of the radio network to which the radio communication device belongs, a beacon in the management information exchange area sometimes collides with a beacon transmitted from a radio communication device in another radio network.

As a countermeasure for this collision, there is a radio communication method described in JP-A-2004-40645. In the radio network according to the radio communication method, the radio communication devices do not respectively communicate with each other, but rather a coordinator which is a control station is disposed which transmits beacons of the radio network to which the station belongs. FIG. 18 is a conceptual diagram showing the radio communication method.

In FIG. 18, when plural radio networks (which correspond to "piconet"s in the drawing) collide with each another on the same frequency channel, the control station of one radio network temporarily sets a buffer super frame cycle 1801 to keep coexistence of the radio networks. When devices other than the control station receive a beacon signal of the buffer super frame cycle 1801, they temporarily set a short super frame cycle based on the super frame cycle to perform fine adjustment of the timing of transmitting the next beacon. A device which could not receive the beacon searches for a beacon of the radio network to which the device belongs during redundant time, and searches for the start timing of a new super frame cycle. The radio communication device can shift the transmission timing of beacons when the beacon collides with the beacon of another radio network by using the buffer super frame cycle 1801.

The above method can be utilized in the case where the radio communication device which transmits beacons in one radio network is the control station only, but when radio communication devices in the respective radio networks transmit beacons as shown in the JP-A-2003-229869, there are a problem that it is difficult for radio communication devices to shift transmission periods of beacons all at once.

DISCLOSURE OF THE INVENTION

An object of the invention is to provide a radio communication method and a radio communication device which can avoid collision with a beacon from a radio communication device of another radio network even when radio communication devices in the respective radio networks transmit beacons.

A radio communication method of the invention includes a step in which when a first radio communication device detects a beacon of a radio network to which the device does not belong (hereinafter, referred to as "another network") in a beacon transmission period used in the radio network to which the device belongs (hereinafter, referred to as "its own network"), it transmits a beacon performing a collision notification which gives notice of the collision of the beacon and gives notice that the beacon transmission period of its own network has moved to a new time slot other than the transmission time slot of the beacon of another network, a step in which when a second radio communication device which belongs to the same network as the first radio communication device receives the collision notification from the first radio communication device, the second radio communication device relays and transmits the collision notification, a step in which when a third radio communication device which belongs to the same network as the first radio communication device and the second radio communication device receives the collision notification from the second radio communication device, the third radio communication device also relays and transmits the collision notification, a step in which the first radio communication device moves the beacon transmission period to the new time slot and transmits a beacon, a step in which when the second radio communication device receives the beacon from the first radio communication device, the second radio communication device transmits a beacon in the new beacon transmission period from that time onward, and a step in which when the third radio communication device receives the beacon from the second radio communication device, the third radio communication device transmits a beacon in the new beacon transmission period from that time onward.

In this manner, all radio communication devices belonging to the same network can know the collision of the beacon, and therefore it is possible that the devices sequentially move to a new beacon transmission period in which the collision does not occur.

In the radio communication method of the invention, the first radio communication device also includes a lifetime of the notification in the collision notification and transmits a beacon at the new time slot within the lifetime, and the second radio communication device and the third radio communication device stop relaying the collision notification when the notified lifetime has expired.

In this manner, when the lifetime has expired, the relay of the collision notification is not performed, and therefore the collision notification can be prevented from continually being relayed in the network.

In the radio communication method of the invention, the first radio communication device also includes a device ID for identifying itself in the collision notification, and when the second radio communication device and the third radio communication device receive collision notifications whose device IDs are the same, they give precedence to the notification whose lifetime is larger.

In this manner, the radio communication devices belonging to the same network give precedence to the notification having larger lifetime even when the notifications become out of sequence because of the manner of propagation in the radio network, the devices can continually update information to new information and can move the beacon transmission period sequentially without delay.

In the radio communication method of the invention, when the second radio communication device and the third radio communication device receive collision notifications in which a device ID is different, they give precedence to the collision notification having either the maximum device ID or the minimum device ID among the device IDs, which were previously prescribed in their network.

In this manner, even when radio communication devices in the same network receive plural collision notifications, they can move the beacon transmission period uniformly.

In the radio communication method of the invention, communication is prohibited in the first radio communication device, the second radio communication device and the third radio communication device during the time from transmission or reception of the collision notification until the reception of a beacon of a transmission destination radio communication device at the new time slot.

In this manner, the radio communication devices in the same network do not communicate during the transition to the new beacon transmission period, and therefore devices can be prevented from being in a communication-disabled state because of discrepancy of communication time slots.

The radio communication method of the invention also includes a step in which the first radio communication device transmits a beacon for performing a collision cancellation notification which gives notice that the beacon collision has been cancelled when the device does not detect a beacon of another network throughout a predetermined period of time in the beacon transmission period of its own network after the collision notification, and a step in which when the second radio communication device and the third radio communication device receive the collision cancellation notification, they stop moving to the new time slot in the beacon transmission period and relay and transmit the collision cancellation notification.

In this manner, the radio communication device can cancel the instruction for moving the beacon transmission period, and therefore it is possible to avoid unnecessary movement of the beacon transmission period.

In the radio communication method of the invention, the first radio communication device also includes a lifetime in the collision cancellation notification, and the second radio communication device and the third radio communication device end the relay when the lifetime has expired.

In this manner, after the lifetime has expired, the relay of the collision cancellation notification is not performed, and therefore the collision cancellation notification can be prevented from continually being relayed.

In the radio communication method of the invention, the first radio communication device also includes a device ID for identifying itself in the collision cancellation notification, and when the second radio communication device and the third radio communication device receive a collision cancellation notification whose device ID is the same, they delete the setting of the lifetime which has been given by the collision notification in the case where the lifetime of the collision cancellation notification is larger than the lifetime of the collision notification.

In this manner, the radio communication devices can give precedence to the latest notification even when it receives both a collision notification and a collision cancellation notification, and therefore the devices can recognize the collision state correctly.

In the radio communication method of the invention, if after the second radio communication device and the third radio communication device receive the collision cancellation notification they receive a collision notification whose device ID is the same, they delete the setting of the lifetime which has been given by the collision cancellation notification in the case where the lifetime of the collision notification is larger than the lifetime of the collision cancellation notification.

In this manner, even when radio communication devices belonging to the same network receive both the collision cancellation notification and the collision notification, they enable the latest information to be valid, and as a result the devices can recognize the collision state correctly at any time.

The radio communication method of the invention also includes a step in which when the first radio communication device detects a beacon of another network outside of the beacon transmission period used by the network to which the device belongs, the device transmits a beacon for performing a beacon period notification which gives notice of the detected beacon transmission period, a step in which when the second radio communication device receives the beacon period notification from the first radio communication device, the second radio communication device relays and transmits the beacon period notification, and a step in which when the third radio communication device receives the beacon period notification from the second radio communication device, the third radio communication device also relays and transmits the beacon period notification.

In this manner, all radio communication devices belonging to the same network can know the presence of the beacon of another beacon group, and therefore the devices can move to a time slot in which that beacon transmission period is avoided when moving to a new beacon transmission period.

In the radio communication method of the invention, when the first radio communication device performs the collision notification, it finds a new time slot to which the device will move from which the beacon transmission period given by the beacon period notification from another radio communication device belonging to the same network is removed.

In this manner, the radio communication devices belonging the same network can move to a time slot from which the beacon transmission period given by the beacon period notification is removed when moving to a new beacon transmission period.

In the radio communication method of the invention, the first radio communication device also includes a lifetime of the notification in the beacon period notification, and the first radio communication device to the third radio communication device stop relaying the beacon period notification when the lifetime of the beacon period notification has expired.

In this manner, the relay of the beacon period notification is also not performed when the lifetime has expired, and therefore the beacon period notification can be prevented from continually being relayed.

In the radio communication method of the invention, the second radio communication device also includes a device ID for identifying itself in the beacon period notification, and when the third radio communication device receives beacon period notifications whose device IDs are the same, it gives precedence to the notification whose lifetime of the beacon period notification is larger, and when it receives beacon period notifications whose device IDs are different, gives precedence to the beacon period notification having either the maximum ID or the minimum ID among the device IDs, which were previously prescribed in its network.

In this manner, radio communication devices belonging to the same network give precedence to the notification having larger lifetime even when the notification is delayed because of the propagation conditions in the radio network, and therefore the devices can recognize the presence of another beacon group. In addition, it is possible to decrease the beacon period notifications transmitted from different radio communication devices on the network and reduce the size of a beacon frame.

The radio communication method of the invention also includes a step in which if after the second radio communication device receives a beacon period notification, it does not detect a beacon period notification throughout a predetermined period, it transmits a beacon for performing a beacon period discard notification for instructing the discard of the beacon period notification, and a step in which when the third radio communication device receives the beacon period discard notification, it relays and transmits the beacon period discard notification.

In this manner, the radio communication device can cancel the beacon period notification, and therefore it is possible to avoid an unnecessary beacon transmission period.

In the radio communication method of the invention, the second radio communication device also includes a lifetime of the notification in the beacon period discard notification, and the third radio communication device stops relaying the beacon period discard notification when the lifetime of the beacon period discard notification has expired.

In this manner, when the lifetime has expired, the relay of the beacon period discard notification is not performed, and therefore the beacon period discard notification can be prevented from continually being relayed in the network.

In the radio communication method of the invention, the second radio communication device also includes a device ID for identifying the first radio communication device in the beacon period discard notification, and when the third radio communication device receives beacon period discard notifications whose device IDs are the same, it gives precedence to the notification whose lifetime of the beacon period discard notification is larger, and when it receives beacon period discard notifications whose device IDs are different, it gives precedence to the beacon period discard notification having either the maximum device ID or the minimum device ID among the device IDs, as previously prescribed in its network.

In this manner, when radio communication devices belonging to the same network receive beacon period discard notifications whose device ID is the same, they can use the latest information. In addition, when radio communication devices belonging to the same network receive beacon period discard notifications whose device IDs are different, they can discard beacon period information of another beacon group uniformly.

In the radio communication method of the invention, the third radio communication device gives precedence to the notification whose lifetime is larger when it receives notifications with the same device ID.

In this manner, even when the radio communication device receives both the beacon period notification and the beacon period discard notification, it can give precedence to the latest notification, and therefore the device can recognize the presence of another beacon group correctly.

A radio communication device includes a beacon reception unit receiving a beacon and extracting a frame, a frame judgment unit judging whether the extracted frame is one requiring data transmission/reception or one giving notice of a collision with a beacon of another network, a frame constructing unit used when the frame judgment unit has judged that the frame is a collision notification, generating a collision notification frame for relaying the collision notification, and a beacon transmission instruction unit instructing transmission of the collision notification frame at the beacon transmission timing.

In this manner, the radio communication device can relay the notification of beacon collision, and therefore the device can notify all radio communication devices in the same network as to the collision.

In the radio communication device of the invention, the collision notification frame includes information which prescribes a new time slot other than a beacon transmission period of another network as the beacon transmission period, and when the beacon transmission instruction unit receives a beacon detection notification from its own network at the new time slot through the beacon reception unit, it switches the beacon transmission timing to the new time slot.

Accordingly, the radio communication device does not switch the beacon transmission period until it receives a beacon at the new time slot, and therefore all radio communication devices in the same radio network can sequentially move to the beacon transmission period all at once.

In the radio communication device of the invention, the collision notification frame also includes lifetime information of the collision notification, and the frame constructing unit counts the lifetime every time it receives the beacon transmission instruction from the beacon transmission instruction unit and generates the collision notification frame until the expiration of the lifetime.

In this manner, the collision notification is transmitted until the expiration of the lifetime, and therefore the possibility for notifying all radio communication devices on the same network increases. Since when the lifetime has expired, the relay of the collision notification is not performed, the collision notification can be prevented from being continually relayed in the network.

In the radio communication device of the invention, the collision notification frame also includes a device ID for identifying the radio communication device which has transmitted the collision notification frame, and when the frame judgment unit receives collision notification frames whose device IDs are the same, it gives precedence to the frame whose lifetime is larger.

In this manner, radio communication devices belonging to the same network give precedence to the frame whose lifetime is larger even when the notification is delayed because of the propagation in the radio network, and therefore the devices can move the beacon transmission period sequentially without delay.

In the radio communication device of the invention, when the frame judgment unit receives collision notifications whose device IDs are different, it gives precedence to the collision notification having either the maximum device ID or the minimum device ID among the device IDs, which are previously prescribed in its network.

In this manner, radio communication devices belonging to the same network can move the beacon transmission period uniformly even when they receive plural collision notifications.

In the radio communication device of the invention, the frame constructing unit does not generate a frame of data communication from the time when the frame judgment unit transmits or receives the collision notification until the beacon reception unit receives a beacon of a transmission destination radio communication device at the new time slot.

Accordingly, radio communication devices belonging to the same network do not communicate during the transition to a new beacon transmission period, and therefore the devices can be prevented from being in a communication-disabled state due to discrepancy of communication time slots.

The radio communication device of the invention also includes a recording unit recording the collision notification, and when the frame constructing unit receives from the frame judgment unit a collision cancellation notification giving notice that the collision is cancelled, the frame constructing unit discards the record of the collision notification and generates a frame for relaying the collision cancellation notification.

In this manner, the radio communication device can stop the movement of the beacon transmission period and can relay the cancellation to other radio communication devices, and therefore all radio communication devices in the same radio network can stop the movement of the beacon transmission period.

In the radio communication device of the invention, the frame of the collision cancellation notification also includes lifetime information of the collision cancellation notification, and the frame constructing unit counts the lifetime every time it receives a beacon transmission instruction from the beacon transmission instruction unit, and generates the frame of the collision cancellation notification until the expiration of the lifetime.

Accordingly, when the lifetime has expired, the relay of the collision cancellation notification is not performed, and therefore the collision cancellation notification can be prevented from continually being relayed in the network.

In the radio communication device of the invention, the frame of the collision cancellation notification also includes a device ID for identifying the device, and when the frame constructing unit receives a collision cancellation notification whose device ID is the same, it discards the record of the collision notification in the case where the lifetime is larger than the lifetime.

In this manner, the radio communication device can give precedence to the latest notification even when it receives both the collision notification and the collision cancellation notification, and therefore the device can recognize the collision state correctly.

In the radio communication device of the invention, when the frame constructing unit receives a collision cancellation notification, it records the collision cancellation notification in the recording unit, and when the frame constructing unit receives a collision notification frame including the same device ID during the transmission of a frame including the collision cancellation notification in the lifetime, it discards the record of the collision cancellation notification in the case where the lifetime of the collision notification is larger than the lifetime of the collision cancellation notification.

In this manner, the radio communication device can give precedence to the latest notification even when it receives both a collision notification and a collision cancellation notification, and therefore the device can recognize the collision state correctly.

In the radio communication device of the invention, when the frame judgment unit receives information of a beacon transmission period of another network which does not overlap with its own beacon transmission period, it records the beacon transmission period in the recording unit, and when the frame constructing unit detects a beacon transmission period of another network which overlaps with its own beacon transmission period, it generates collision notification frame including information which sets as the beacon transmission period of its network a new time slot from which the beacon transmission period of the network in question and beacon transmission periods of other networks recorded in the recording unit are removed.

In this manner, all radio communication devices belonging to the same network can move to a beacon transmission period which does not overlap with any radio communication devices in other networks entering into the radio network of itself.

In the radio communication method of the invention, each radio communication device transmits a beacon including a network ID for identifying the radio network to which the device belongs, and when they receive a beacon including the beacon transmission period which overlaps with their own beacon transmission period, the radio communication device having the network ID chosen according to a previously prescribed rule deciding between the two in the case where the network ID of the beacon is larger and in the case where the network ID of the beacon is smaller than its own network ID, performs the collision notification.

In this manner, both radio communication devices which have collided with each other do not move their beacon transmission period for avoiding the collision, and therefore unnecessary movement of the beacon transmission period can be prevented and a state in which both radio communication devices move and collide with each other again can be avoided.

As described above, according to the invention, even when respective radio communication devices in the radio network transmit beacons, the devices can communicate with one another without collision with beacons of radio communication devices of other radio networks.

BRIEF DESCRIPTION OF THE DRAWINGS

FIG. 5A is a table showing a configuration of a reception beacon information table according to the embodiment 1 of the invention.

FIG. 5B is a table showing a configuration of a beacon slot position table according to the embodiment 1 of the invention.

Figure 1:
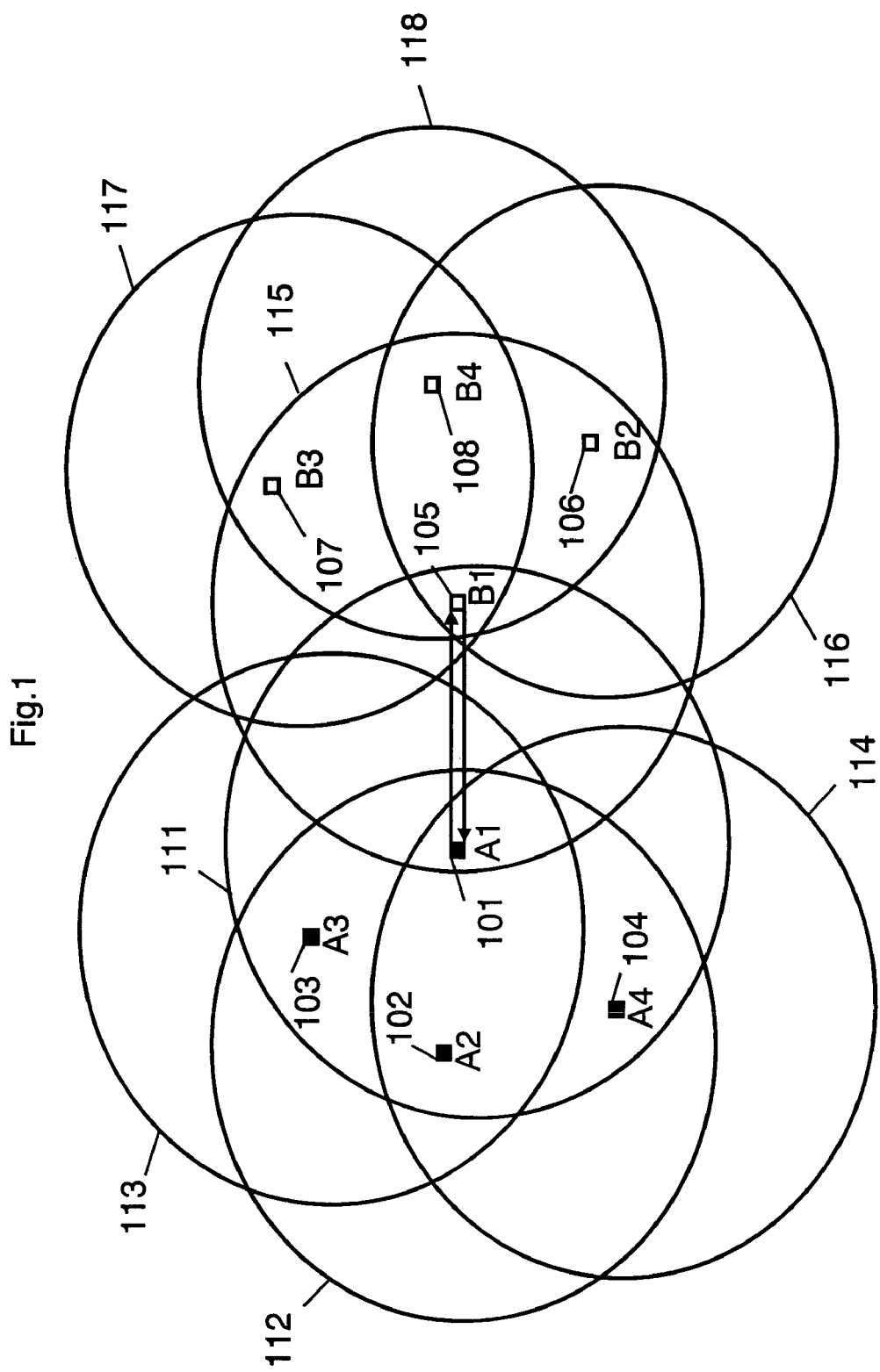
FIG. 1 is a view showing a configuration of a radio communication network according to an embodiment 1 of the invention.

DESCRIPTION OF REFERENCE NUMERALS 101, 102, 103, 104, 105, 106, 107, 108, 1201, 1202 radio communication device
111, 112, 113, 114, 115, 116, 117, 118, 1211, 1212 communicable area
200 antenna
201 radio processing unit
202 frame judgment unit
203 recording unit
204 upper layer processing unit
205 frame constructing unit
206 beacon transmission instruction unit

BEST MODE FOR CARRYING OUT THE INVENTION

Hereinafter, embodiments of the invention will be explained with reference to the drawings.

Embodiment 1

FIG. 1 is a view showing a configuration of a radio communication network according to embodiments of the invention.

In FIG. 1, radio communication devices A1 (101) to A4 (104) constitute one radio network, in which radio communication devices perform multi-access system Ultra Wide Band (UWB) radio communication with other devices in their respective communicable areas 111 to 114, each transmitting data to its whole communicable area by a non-directional antenna. The radio communication devices A1 (101) to A4 (104) can freely move in space. Radio communication devices B1 (105) to B4 (108) constitute another radio network, in which each device performs the UWB radio communication in the same way as the other radio communication devices in communicable areas 115 to 118 respectively. The drawing shows that the radio communication device B1 (105) in the different radio network enters into the communication area 111 of the radio communication device A1 (101).

Figure 2:
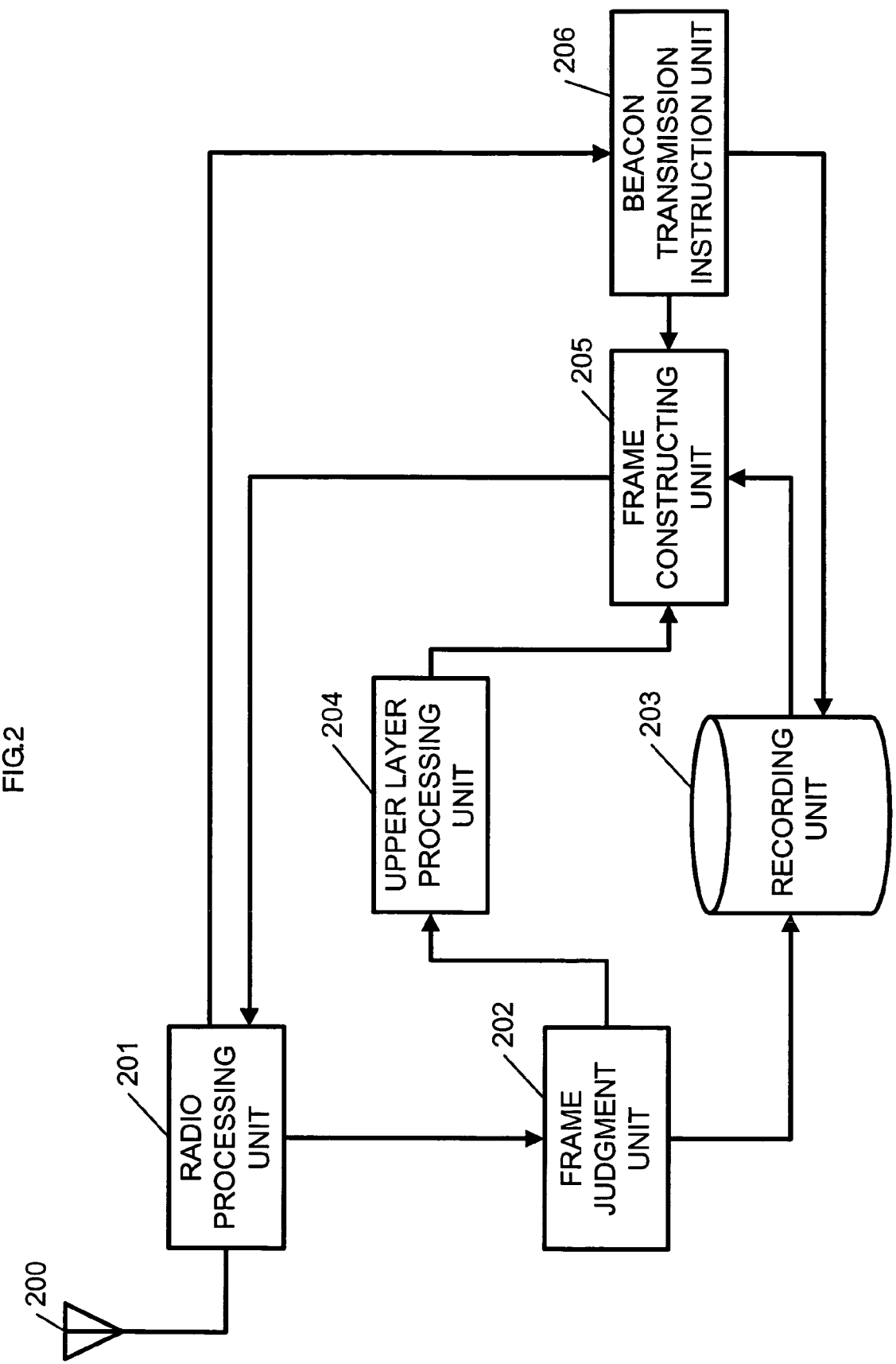
FIG. 2 is a diagram showing a configuration of a radio communication device according to the embodiment of the invention.

FIG. 2 is a block diagram showing a configuration of the radio communication devices 101 to 108.

In FIG. 2, a radio processing unit 201 converts an analog signal received from an antenna 200 into a digital signal to generate a frame, and can receive signals at any time. The radio processing unit 201 converts a digital signal frame into an analog signal to be sent from the antenna 200. The antenna 200 is a non-directional antenna which radiates radio waves in the communicable area.

A frame judgment unit 202 judges whether the frame received by the radio processing unit 201 is a beacon frame or a data frame.

An upper layer processing unit 204 performs protocol processing of TCP/IP layers and higher layers.

A frame constructing unit 205 reads out required information from a recording unit 203 and generates a beacon frame including management information and a data frame.

A beacon transmission instruction unit 206 is a timer, which instructs the frame constructing unit 205 to deliver the generated frame to the radio processing unit 201 in its slot position in a beacon transmission period started from an offset time in every super frame cycle.

Here, the above respective frames will be explained.

Figure 3A:
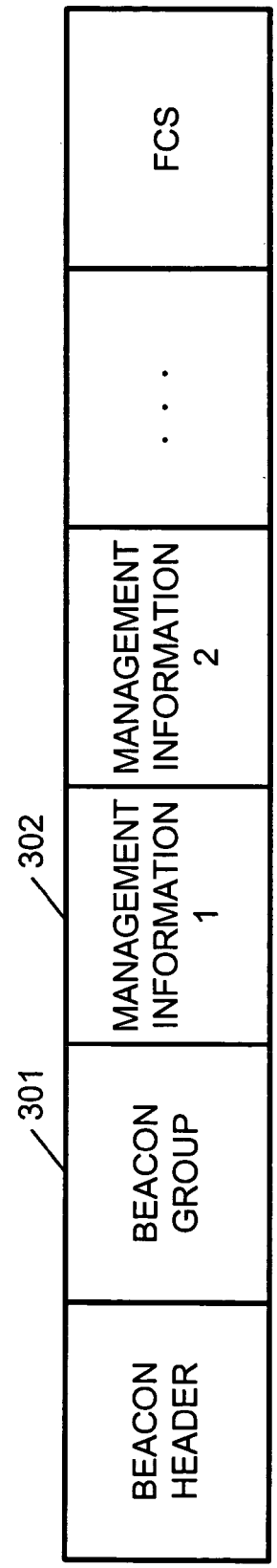
FIG. 3A is a table showing a beacon frame format according to the embodiment 1 of the invention.

FIG. 3A shows a format of the beacon frame.

In FIG. 3A, a beacon group (BG) 301 contains devices whose time slots for transmitting beacons are in the same beacon period, and management information 302 gives notice of collision information of beacons, a transmission time of data and the like, which are added when there are these items of information to be given. The radio communication devices in the same beacon group form one radio network.

Figure 3B:
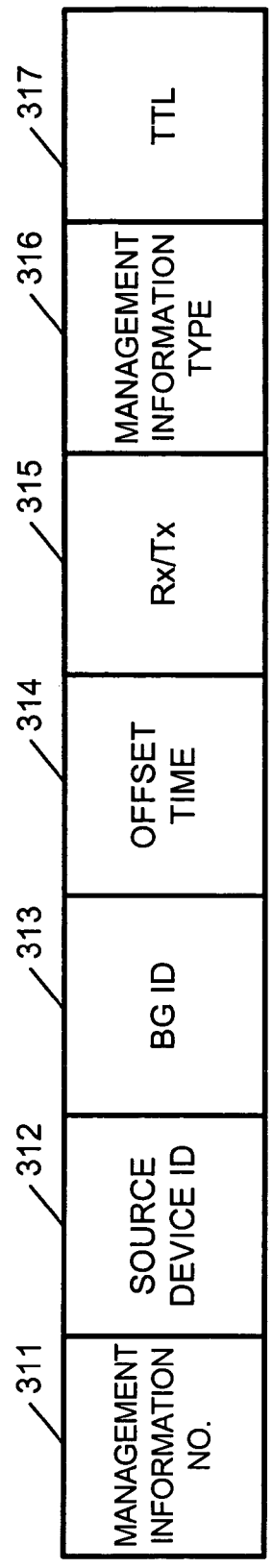
FIG. 3B is a table showing a format of management information according to the embodiment 1 of the invention.

FIG. 3B shows a format of the management information.

In FIG. 3B, a management information number 311 is an ID for identifying management information, source device ID 312 is an ID for identifying the transmission source radio communication device of the management information, BG ID 313 is an ID for identifying the beacon group, offset time 314 is the time from the head of the super frame cycle to the beacon transmission period, an Rx/Tx 315 identifies reception or transmission, a management information type 316 indicates the type of the beacon, and a TTL (Time To Live) 317 indicates the lifetime of the management information.

Figure 4:
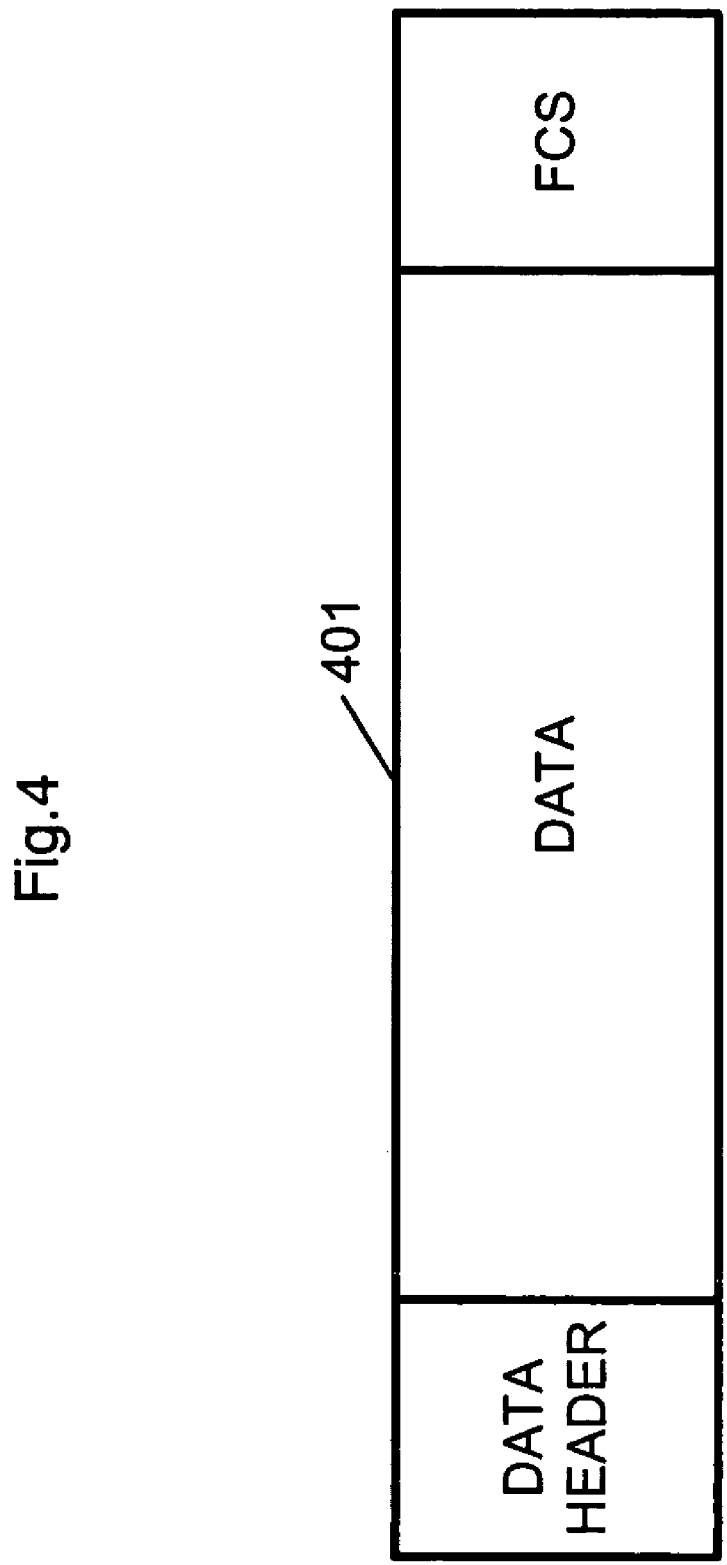
FIG. 4 is a table showing a data frame format according to the embodiment 1 of the invention.

FIG. 4 shows a format of the data frame.

In FIG. 4, in a data 401, communication data such as message contents or control information are written. The frame judgment unit 202 extracts required information from these frames and records it in the recording unit 203.

FIG. 5A shows a format of a reception beacon information table recorded in the recording unit 203.

In FIG. 5A, the source device ID 312, the beacon group 301, the management information type 316, the offset time 314, and the TTL 317 in the received beacon frame are recorded respectively in source device ID 501, beacon group ID 502, management information type 503, offset time 504, and lifetime 505. In the lifetime 505, "1" is subtracted with each super frame by the beacon transmission instruction unit 206 which will be described later.

FIG. 5B is a table in which slot positions for transmitting beacons of respective radio communication devices in the beacon group are recorded.

A device ID 511 is an ID for identifying the radio communication device, and slot position 512 indicates the timing at which the radio communication device transmits the beacon in the beacon transmission period.

Operations and effects of the radio communication device having the above configuration will be explained as follows.

Figure 6:
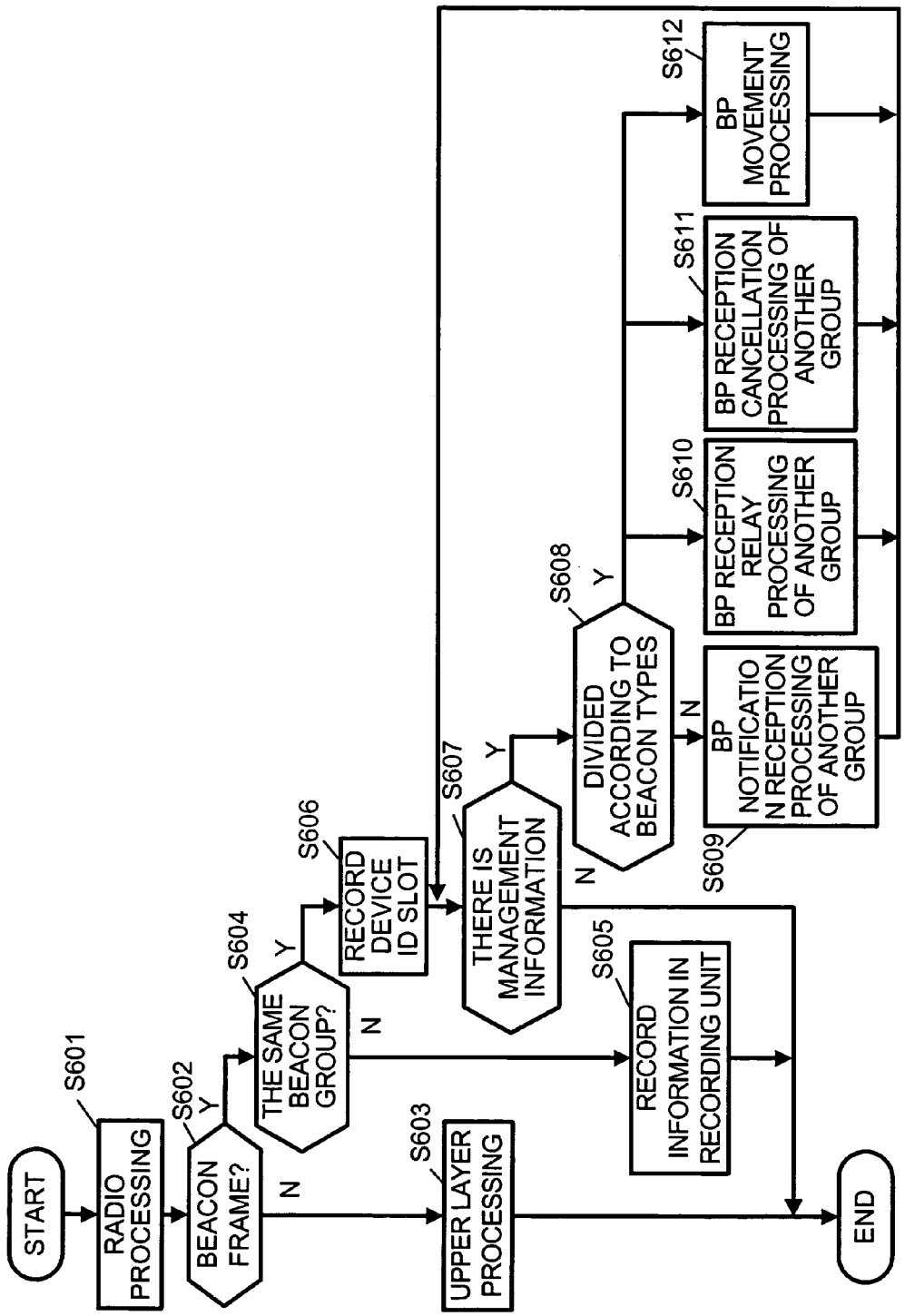
FIG. 6 is a flow chart showing frame reception processing according to the embodiment 1 of the invention.

FIG. 6 is a flow chart showing operations when the radio communication device according to the invention receives a signal.

In FIG. 6, a signal received from the antenna 200 is converted into a digital frame in the radio processing unit 201 (step S601), and the frame judgment unit 202 judges the frame type thereof (step S602). In the case where the received frame is not a beacon frame, upper layer processing is performed in the upper layer processing unit 204 (step S603); in the case where the frame is a beacon frame, whether the beacon frame is from the same beacon group as the beacon group to which the device itself belongs is judged (step S604).

Next, when the frame is not from the same beacon group, the frame judgment unit 202 records respective information written in the management information 302 in the reception beacon information table in the recording unit 203 (step S605).

On the other hand, when the frame is from the same beacon group, the frame judgment unit 202 records the slot position in the beacon reception period (hereinafter, referred to as a "beacon period (BP)") and the source device ID 501 of the received beacon in the beacon slot position recording table shown in FIG. 5B (step S606).

Next, when there is management information 302 in the beacon frame, the frame judgment unit 202 judges whether the information has been processed or not (step S607). When there is no management information 302, the frame judgment unit 202 ends the process, and when there is such information, the frame judgment unit 202 extracts the management information type 316 from the management information 302 and determines the management information type (step S608).

The management information types comprise a management information type "0" indicating the reception of the beacon of another beacon group, a management information type "1" indicating the reception of the beacon of another beacon group, a management information type "2" indicating the cancellation of collision with the beacon of another beacon group, and a management information type "3" indicating the movement of the temporal position of the "BP" in the super frame.

When the frame judgment unit 202 receives the beacon of the management type "0", it performs processing of the BP notification received from another group (step S609), and when it receives the management information type "1", it performs processing of the "BP" relay received from another group (step S610). When the frame judgment unit 202 receives the management information type "2", it performs processing of the "BP" cancellation received from another group (step S611), and when it receives the management information type "3", it performs processing of the "BP" movement (step S612). After that, the process in the frame judgment unit 202 proceeds to the step S607.

Hereinafter, respective processings of step S609 to step S612 will be explained.

Figure 7:
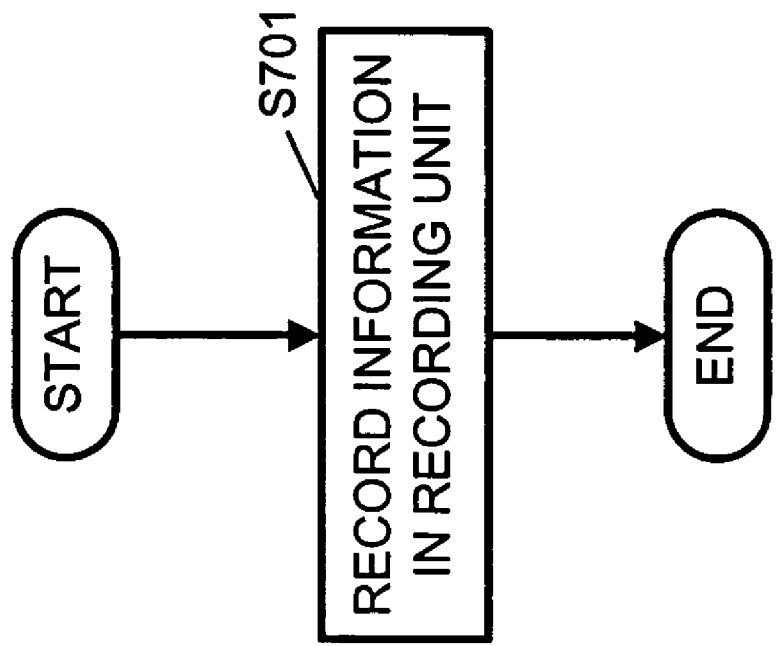
FIG. 7 is a flow chart showing BP notification reception processing according to the embodiment 1 of the invention.

FIG. 7 is a flow chart showing the processing of the BP notification received from another group (step S609). The frame judgment unit 202 records information extracted from the management information 302 in the reception beacon information table in the recording unit 203 (step S701) and ends the process.

Figure 8:
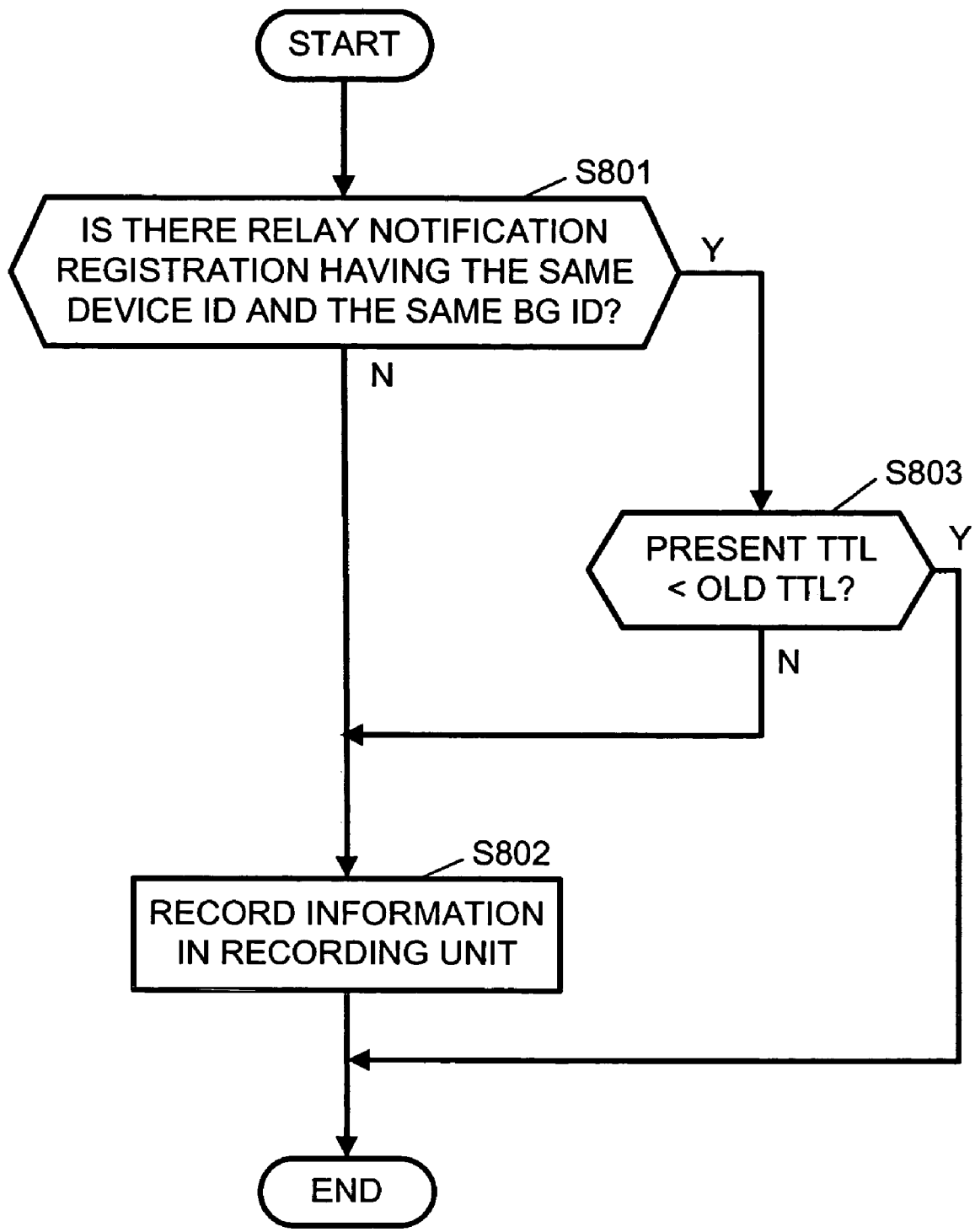
FIG. 8 is a flow chart showing BP reception relay processing according to the embodiment 1 of the invention.

FIG. 8 is a flow chart showing the processing of "BP" relay received from another group (step S610). The frame judgment unit 202 extracts the source device ID 312 and BG ID 313 from the management information 302. Then, the frame judgment unit 202 judges whether there is already a registration of the reception of management information which has the same source device ID and the beacon group ID as these IDs and which is of the management information type "1" in the reception beacon information table or not (step S801). When there is no registration of such reception, the frame judgment unit 202 records the information in the reception beacon information table as new information (step S802), and ends the process.

On the other hand, when there is registration, the frame judgment unit 202 compares the TTL 317 of the management information 302 to the lifetime 505 in the registered information (step S803). When the TTL 317 is larger, the process proceeds to step S802 to update the reception beacon information table. When the TTL 317 is smaller, the frame judgment unit 202 judges that the information is older than the registered information, and ends the process as it is.

Figure 9:
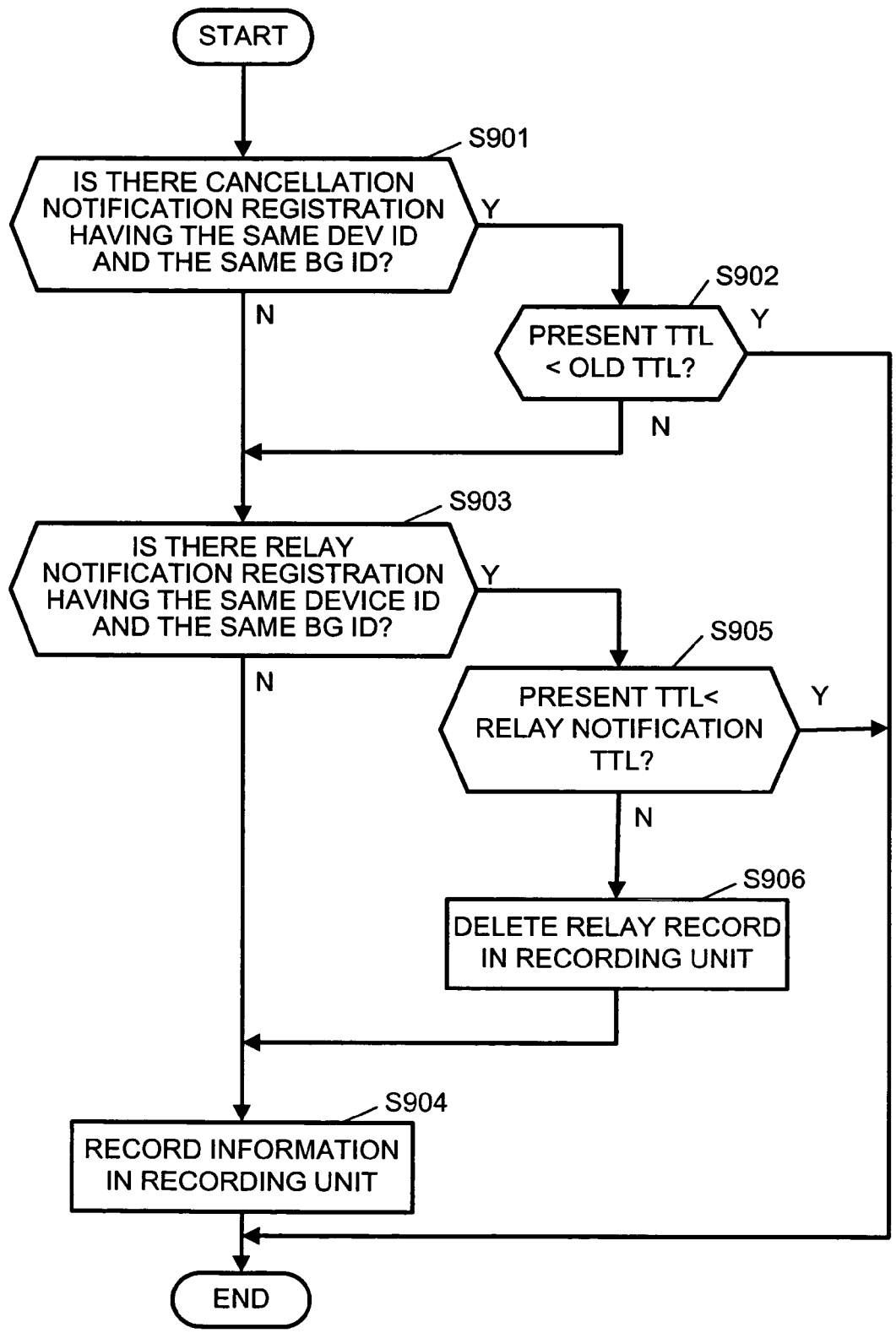
FIG. 9 is a flow chart showing BP reception cancellation processing according to the embodiment 1 of the invention.

FIG. 9 is a flow chart showing the processing of "BP" cancellation received from another group (step S611). The frame judgment unit 202 extracts the source device ID 312 and the BG ID 313 from the management information 302. Then, the frame judgment unit 202 judges whether there is already a registration of the reception of management information which has the same source device ID and the beacon group ID as these IDs and which is the manage information type "2" in the reception beacon information table or not (step S901). When there is such registration, the frame judgment unit 202 judges whether the TTL 317 of the received management information 302 is smaller than the lifetime 505 of the registered information (step S 902), and in the case where it is smaller, ends the process.

On the other hand, in the case where the TTL 317 is larger, the frame judgment unit 202 judges whether there is a registration of the reception of the management information type "1" or not (step S903). When there is no such registration, the frame judgment unit 202 records information of the management information 302 in the reception beacon information table in the recording unit 203 (step S904).

On the other hand, when there is registration, the frame judgment unit 202 judges whether the TTL 317 of the received management information 302 is smaller than the lifetime 505 of the registered information (step S905), and in the case where the TTL 317 is smaller, ends the process.

In the case where the TTL 317 is larger, the frame judgment unit 202 deletes the record of the management information type "1" from the reception beacon information table (step S906), and proceeds to step S904.

Figure 10:
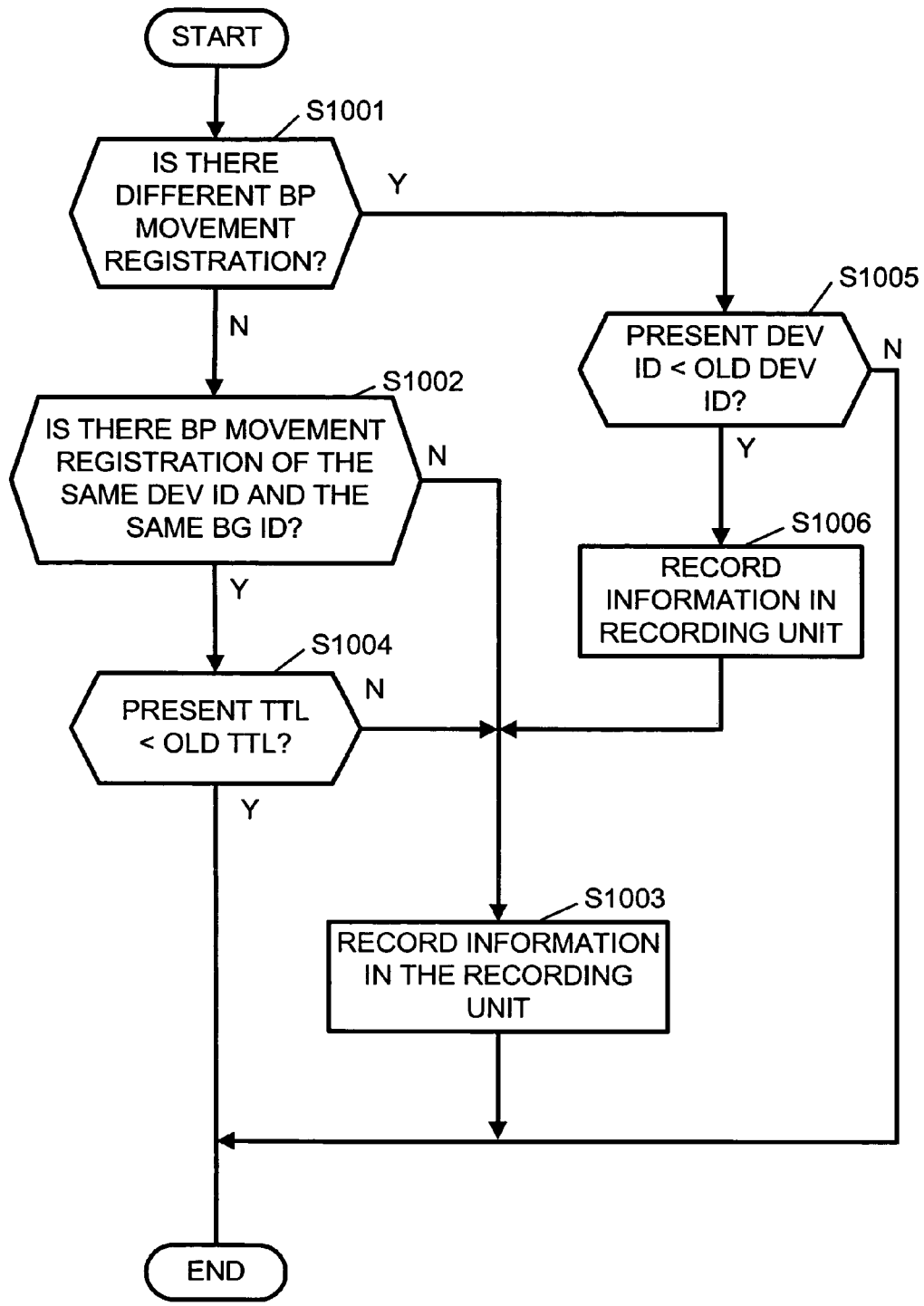
FIG. 10 is a flow chart showing BP movement processing according to the embodiment 1 of the invention.

FIG. 10 is a flow chart showing the movement processing of the "BP" (step S612).

The frame judgment unit 202 refers to the reception beacon information table and judges whether there is a registration of the management information type "3" whose offset time 314 is the same or not (step S1001). When there is no such registration, the frame judgment unit 202 judges whether there is a registration whose source device ID and the beacon group ID are the same as the source device ID 312 and the BG ID 312 extracted from the management information 302 (step S1002). In the case where there is no such registration, the frame judgment unit 202 records information of the management information 302 in the reception beacon information table (step S1003), and ends the process.

In the case where there is such a registration, the frame judgment unit 202 judges whether the TTL 317 of the received management information 302 is smaller than the lifetime 505 in the registered information (step S1004). When the TTL is smaller, the process ends, and when the TTL is larger, the process proceeds to the step S1003.

In the step S1001, when there is a registration whose offset time 314 is the same, the frame judgment unit 202 judges whether the TTL 317 of the received management information 302 is smaller than the lifetime 505 of the registered information (step S1005). In the case where the TTL 317 is smaller, the frame judgment unit 202 deletes the record of the recorded management information type "3" and proceeds to step S1003.

In the case where the TTL 317 is larger, the frame judgment unit 202 ends the process as it is.

The above are operations when the radio communication device according to the invention receives a-signal.

Figure 11:
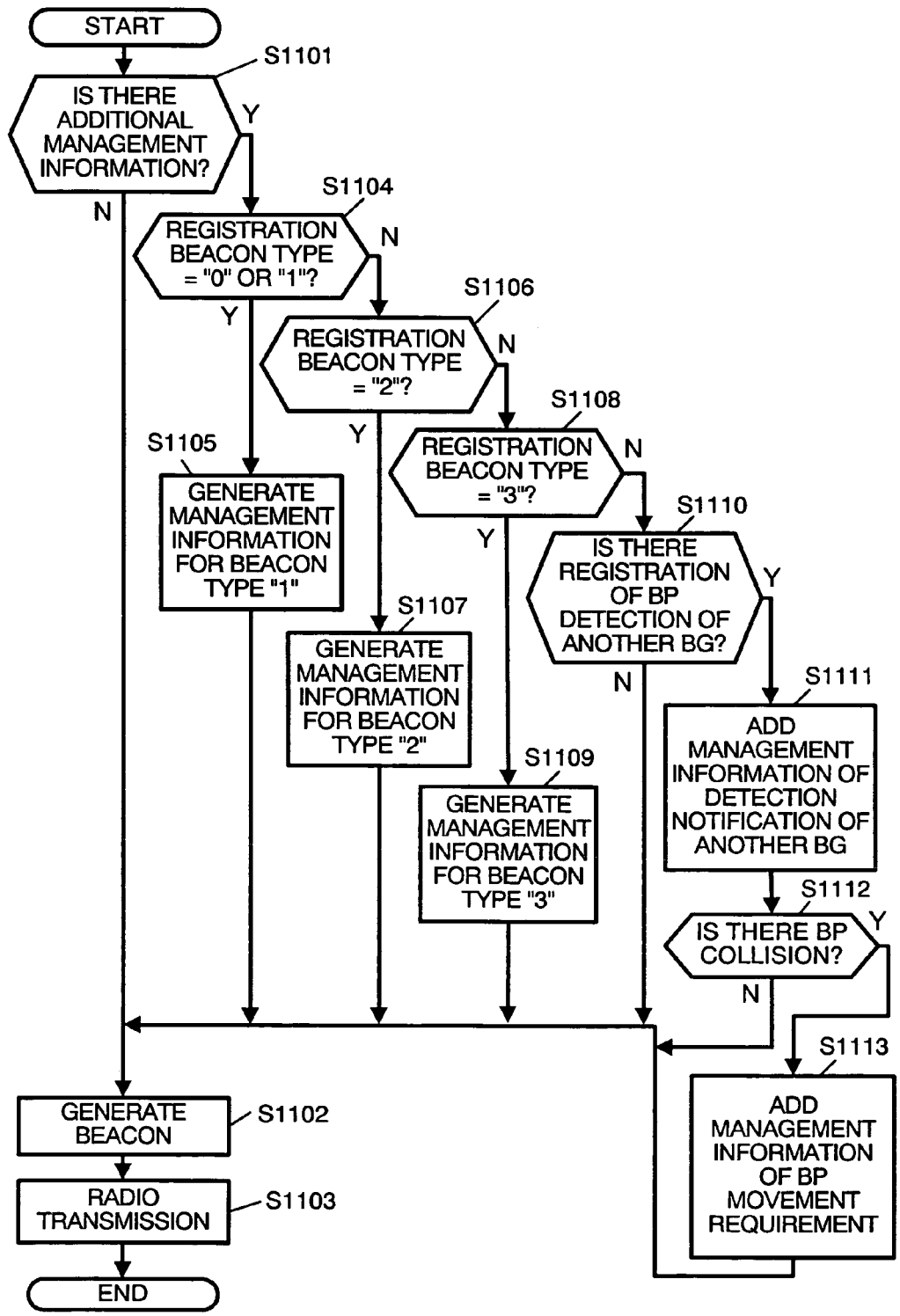
FIG. 11 is a flow chart showing frame transmission processing according to the embodiment 1 of the invention.

Next, operations when the radio communication device according to the invention transmits a beacon will be explained. FIG. 11 is a flow chart showing the operations at the time. The timing of transmitting beacons is given to the frame constructing unit 205 from the beacon transmission instruction unit 206 at every super frame.

In FIG. 11, the frame constructing unit 205 checks records of the reception beacon information table in the recording unit 203 and judges whether information whose lifetime 505 is not "0" and the management information type 503 is any of types "0" to "3" is registered or not (step S1101). In the case where there is no such registration, the frame constructing unit 205 generates a beacon frame to which management information is not added and delivers the frame to the radio processing unit 201 (step S1102).

The radio processing unit 201 receives the beacon frame and converts the beacon frame into an UWB signal, which is sent through the antenna 200 (step S1103).

In the step S1101, when the information of any of the management information types "0" to "3" is registered, the frame constructing unit 205 generates the management information 302 depending on the management information type.

In the case where the management information type of the information recorded in the reception beacon information table is type "0" or type "1" (step S1104), the frame constructing unit 205 generates management information 302 to be added to the beacon frame for relaying this received management information to the radio communication devices of the same beacon group. Specifically, the frame constructing unit 205 sets information of registered source device ID 501 in source device ID 312 of the management information 302, sets information of the beacon group ID 502 in the BG ID 313, sets information of the offset time 504 in the offset time 314, sets Tx in the Rx/Tx 315, sets the management information type "1" in the management information type 316, and sets time in which "1" is subtracted from the lifetime 505 in the TTL 317 (step S1105). After that, the process in the frame constructing unit 205 proceeds to step S1102.

In the case where the management information type of the information recorded in the reception beacon information table is the type "2" (step S1106), the frame constructing unit 205 generates management information 302 to be added to the beacon frame in the same way as the step S1105, for relaying the management information to the radio communication devices of the same beacon group. The management information type "2" is set in the management information type 316 (step S1107). After that, the process proceeds to the step S1102.

In the case where the management information type of the information recorded in the reception beacon information table is the type "3" (step S1108), the frame constructing unit 205 generates management information 302 to be added to the beacon frame in the same way as the step S1105, for relaying the management information to the radio communication devices of the same beacon group. The management information type "3" is set in the management information type 316 (step S1109). After that, the processing of the frame constructing unit 205 proceeds to step S1102.

In the case where the beacon group of the information recorded in the reception beacon information table is not the beacon group of the frame constructing unit 205 (step S1110), frame constructing unit 205 generates management information 302 to be added to the beacon frame for transmission to the radio communication devices of the same beacon group. Specifically, the frame constructing unit 205 sets its device ID in the source device ID 312, sets the beacon group ID of itself in the BG ID 313, sets information of the offset time 504 in the offset time 314, sets Tx in the Rx/Tx 315, sets the management information type "0" in the management information type 316 and sets time in which "1" is subtracted from the lifetime 505 in the TTL 317 of the management information 302 (Step S1111).

Next, when the offset time 314 is in the beacon transmission period "BP" of the beacon group of frame constructing unit 205, it judges that there is a danger of collision of beacons (step S1112), and generates management information for notifying the radio communication devices of the beacon group to which the device belongs as to the movement of the beacon transmission period "BP". Specifically, the frame constructing unit 205 finds anew a time slot with which the beacon transmission period "BP" does not overlap based on the offset time 504 in FIG. 5A. Then, the offset time whereby that time slot becomes the beacon transmission period "BP" is set in the offset time 314 of the management information 302. The frame constructing unit 205 also sets the management information type "3" in the management information type 316 and sets "255" in the TTL 317. In other fields, the same values in step S1112 are set (step S1113). After that, the processing of the frame constructing unit 205 proceeds to step S1102.

In the TTL 317, not only "255" but an appropriate value according to the network size instead can be set.

The above are operations when the radio communication device according to the invention transmits the beacon. Accordingly, the radio communication device continues transmitting the beacon giving notice of the registered management information until the lifetime 505 of the reception beacon information table becomes "0".

Next, when the radio communication device according to the invention operating as above communicates with radio communication devices in the same beacon group mutually, operations in the case where radio communication devices of other beacon groups enter into the communication area will be explained as follows.

Figure 12:
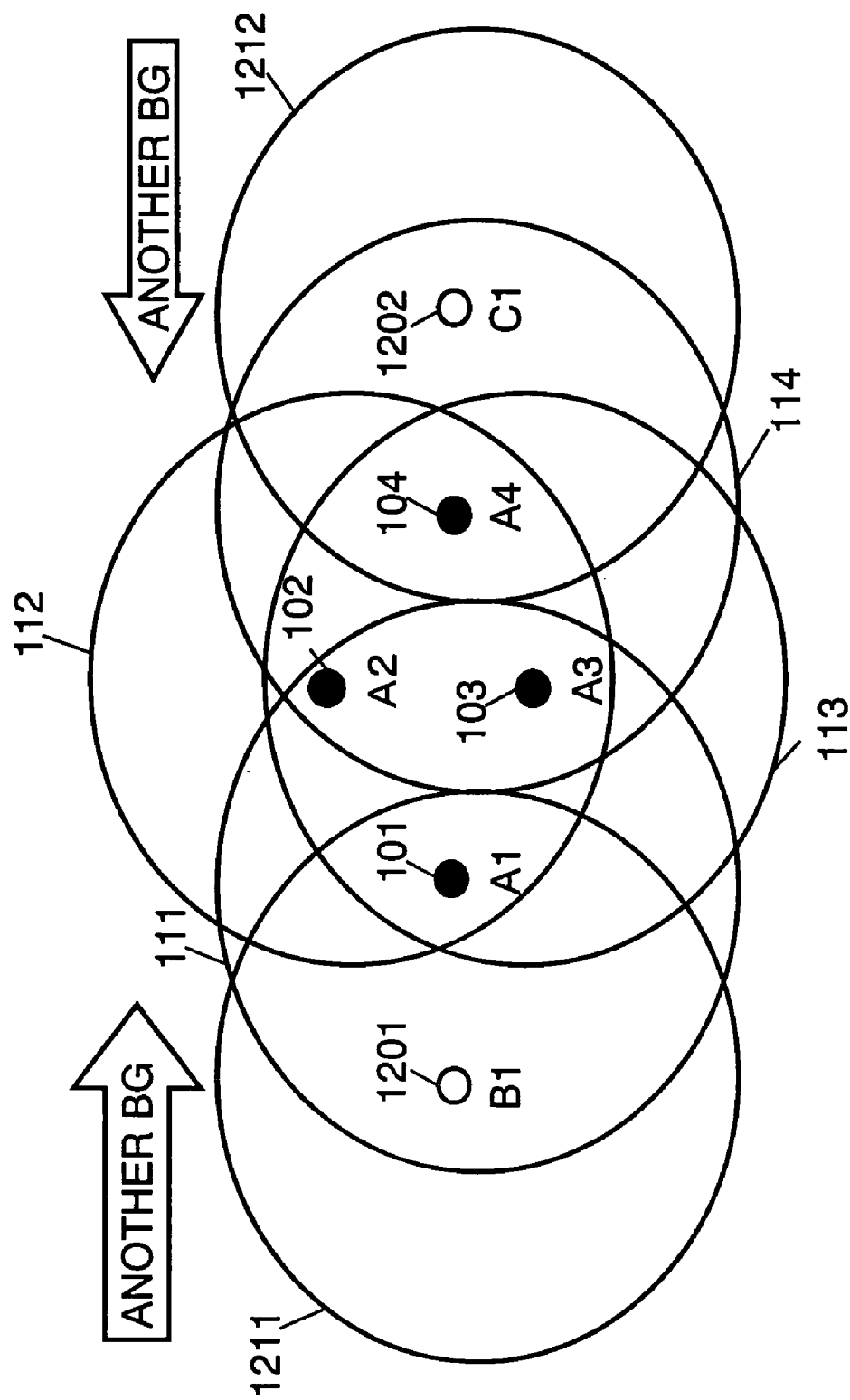
FIG. 12 is a view showing collisions between radio communication networks according to the embodiment 1 of the invention.

FIG. 12 is a conceptual view showing a state when a device B1 and a device C1 of other beacon groups enter into the communication area of the radio communication devices 101 to 104 of the same beacon group.

In FIG. 12, the radio communication device A1 (101) can communicate with the radio communication device A2 (102) and the radio communication device A3 (103) in the communication area 111 of radio communication device A1, but it cannot communicate with the radio communication device A4 (104). The radio communication device A2 (102) and the radio communication device A3 (103) have the radio communication device A1 (101) and the radio communication device A4 (104) in their communication areas 112 and 113 respectively, and therefore they can communicate with all radio communication devices in the same beacon group. The radio communication device A4 (104) can communicate with the radio communication device A2 (102) and the radio communication device A3 (103) in the communication area 111 of radio communication device A4, but, it cannot communicate with the radio communication device A1 (101). Furthermore, the radio communication device B1 (1201) enters only into the communication area of the radio communication device A1 (101), and therefore the radio communication devices A2 (102) to A4 (104) cannot detect a beacon from the radio communication device B1 (1201). Similarly, the radio communication device C1 (1202) enters only into the communication area of the radio communication device A4 (104), and therefore the radio communication devices A1 (101) to A3 (103) cannot detect a beacon from the radio communication device C1 (1202).

Figure 13:
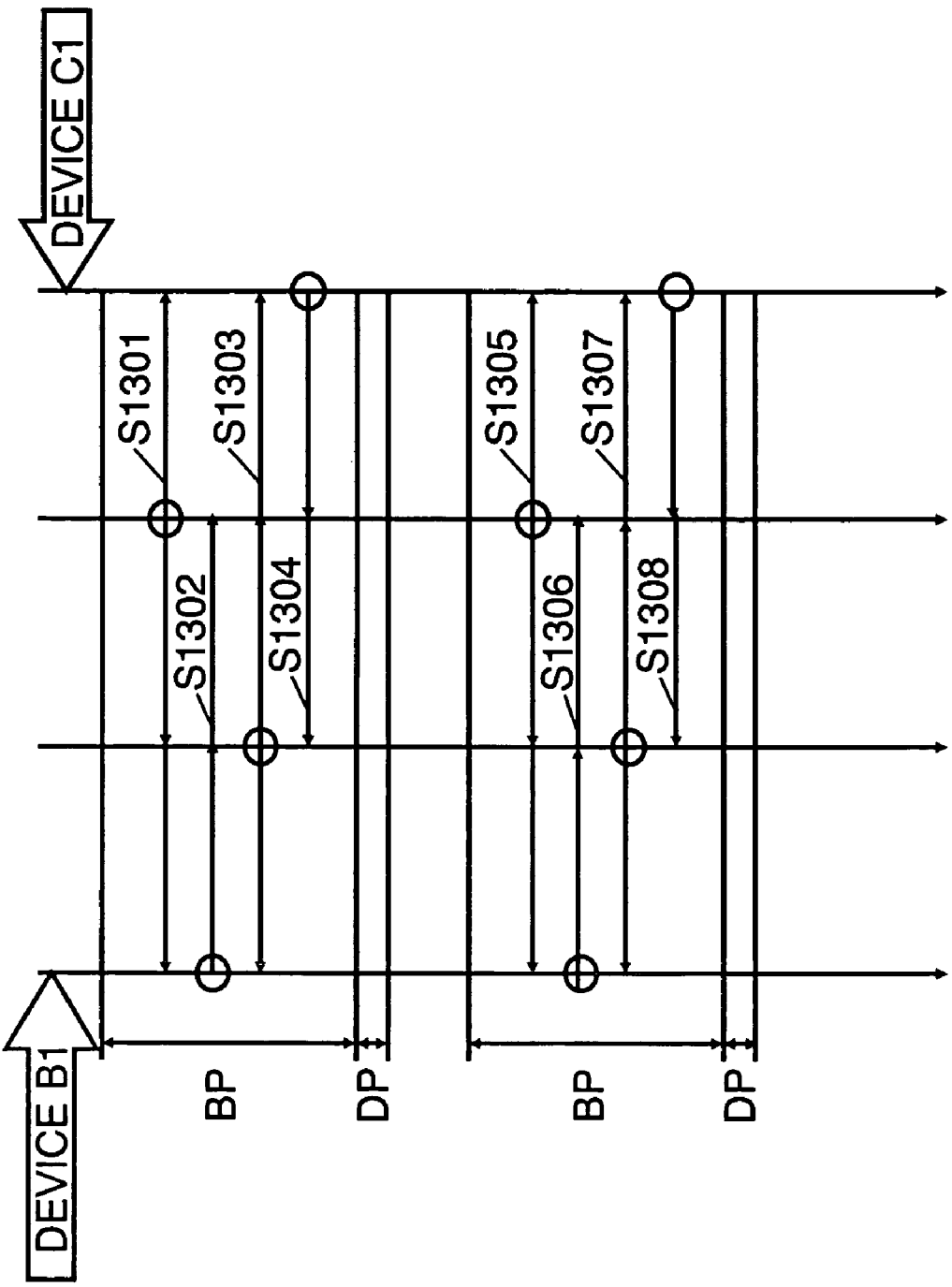
FIG. 13 is a diagram showing processing performed by radio communication devices when the beacon collision occurs according to the embodiment 1 of the invention.

FIG. 13 is a sequence diagram explaining the radio communication method according to the invention at this time. The case shall be considered where "BP"s of the radio communication device B1 and the radio communication device C1 do not overlap with the "BP" of the beacon group of the radio communication devices A1 to A3.

First, in order for the radio communication device A3 (103) to make communication with the radio communication device A1 (101), A2 (102) and A4 (104) in the communicable area 113, it transmits a normal beacon not including management information in the area 113 through a non-directional antenna in its slot in the beacon transmission period "BP" (step S1301).

Next, since the radio communication device A1 (101) has detected the beacon from the radio communication device B1 (1201), it generates management information A1-0 of the management information type "0". Then, the radio communication device A1 (101) transmits a beacon to which the management information A1-0 is added in its slot (step S1302).

Next, the radio communication device A2 (102) receives the beacon from the radio communication device A1 (101) and generates management information A1-1 of the management information type "1" for relaying the management information A1-0. Then, the radio communication device A2 (102) transmits a beacon to which the management information A1-1 is added in its slot (step S1303).

Next, the radio communication device A4 (104) receives the beacon from the radio communication device A2 (102) and generates management information A1-1 of the management information type "1" for relaying the management information A1-1 which is added to the beacon. Since the radio communication device A4 (104) has detected the beacon from the radio communication device C1 (1202), it also generates management information A4-0 of the management information type "0" for giving notice of the detection to the radio communication devices of the beacon group to which the device itself belongs. Then, the radio communication device A4 (104) transmits a beacon to which the management information A1-1, A4-0 are added in its slot (step S1304).

Next, the radio communication device A3 (103) receives the beacon from the radio communication device A4 (104) and generates management information A1-1, A4-1 of the management information type "1" for relaying the management information A1-1, A4-0 which are added to the beacon. Then, the radio communication device A3 (103) transmits a beacon to which the management information A1-1, A4-1 are added in its slot in the next super frame cycle (step S1305).

Next, the radio communication device A1 (101) receives the beacon from the radio communication device A3 (103) and generates management information A4-1 of the management information type "1" for relaying the management information A4-1 which is added to the beacon. The radio communication device A1 (101) also receives the management information A1-1, but the source device ID of the management information is its own ID, and therefore the device does not relay the management information and discards it. Instead, the radio communication device A1 (101) continues detecting beacons from the radio communication device B1 (1201), and therefore it generates anew management information A1-0 of the management information type "0". Then, the radio communication device A1 (101) transmits a beacon to which the management information A1-0, A4-1 are added in its slot (step S1306).

Next, the radio communication device A2 (102) receives the beacon from the radio communication device A1 (101) and generates management information A1-1, A4-1 of the management information type "1" for relaying the management information A1-0, A4-1. Then, the radio communication device A2 (102) transmits a beacon to which the management information A1-1, A4-1 is added in its slot (step S1307).

Next, the radio communication device A4 (104) receives the beacon from the radio communication device A2 (102) and generates management information A1-1 of the management information type "1" for relaying the management information A1-1 which is added to the beacon. The radio communication device A4 (104) receives the management information A4-1, but the source device ID of the management information is its own ID, and therefore the device does not relay the management information and discards it. Instead, the radio communication device A4 (104) continues detecting beacons from the radio communication device C1 (1202), and therefore it generates anew management information A4-0 of the management information type "0". Then, the radio communication device A4 (104) transmits a beacon to which management information A1-1, A4-0 are added in its slot (step S1308).

The above are operations when the radio communication device B1 (1201) and the radio communication device C1 (1202) of another beacon group enter into the mutual communication area of the radio communication device A1 (101) and the radio communication device A4 (104) which are in the same beacon group.

Accordingly, the radio communication devices in the same beacon group can know that the radio communication devices of other beacon groups have entered. In the above example, the beacon transmission period "BP" does not overlap with the entered radio communication device, and therefore an operation for moving the beacon transmission period is not performed.

Next, operations when the radio communication device C1 (1202) exits from the communication area 114 of the radio communication device A4 (104) will be explained.

Figure 14:
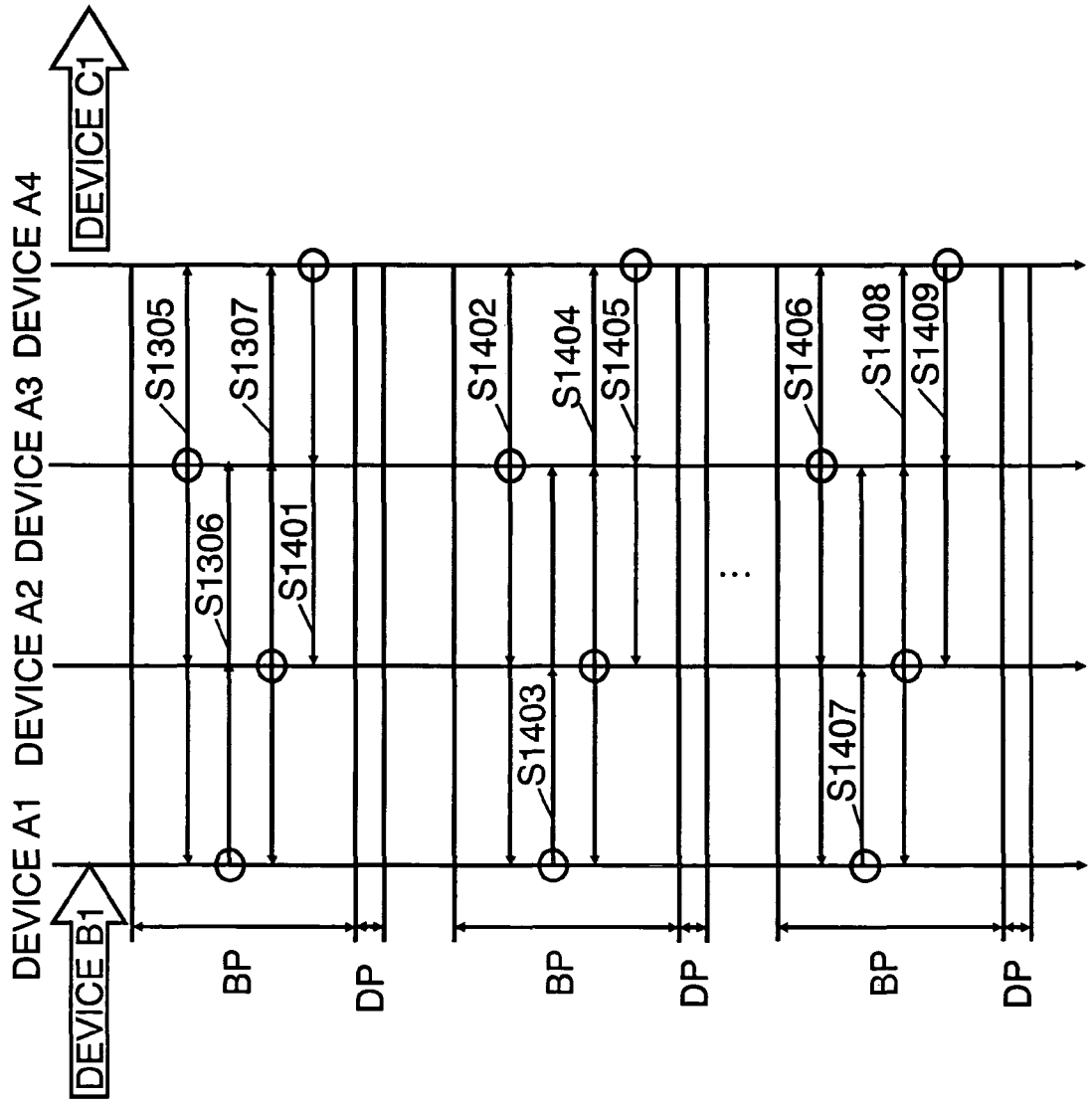
FIG. 14 is a diagram showing processing performed by radio communication devices when the beacon collision is cancelled according to the embodiment 1 of the invention.

FIG. 14 is a sequence diagram showing operations at this time, and the sequence from step S1305 to step S1307 is the same as one in FIG. 13.

The radio communication device A4 (104) receives the beacon from the radio communication device A2 (102) and generates management information A1-1 of the management information type "1" for relaying the management information A1-1 which is added to the beacon. The radio communication device A4 (104) receives the management information A4-1, but the source device ID of the management information is its own ID, and therefore the device does not relay the management information and discards it. The radio communication device A4 (104) does not detect a beacon from the radio communication device C1 (1202) at this time, and therefore the device does not generate further management information. Then, the radio communication device A4 (104) transmits a beacon to which the management information A1-1 is added in its slot (step S1401).

Next, the radio communication device A3 (103) receives the beacon from the radio communication device A4 (104) and generates management information A1-1 of the management information type "1" for relaying the management information A1-1 which is added to the beacon. The radio communication device A3 (103) detects in the reception beacon information table that the source device ID is the radio communication device A4 (104) and that the management information A4-0 of the management information type "0", indicating that the beacon group is different from radio communication device A3 (103), is registered, and recognizes that the management information A4-0 is not received at present. Accordingly, the radio communication device A3 (103) judges that the radio communication device C1 (1202) has exited and generates management information A4-2 of the management information type "2". Then, the radio communication device A3 (103) transmits a beacon to which the management information A1-1, A4-2 are added in its slot in the next super frame cycle (step S1402).

Next, the radio communication device A1 (101) receives the beacon from the radio communication device A3 (103) and generates management information A4-2 of the management information type "2" for relaying the management information A4-2 which is added to the beacon. At this time, the radio communication device A1 (101) deletes management information in the reception beacon information table of the management information type "1" in which the source device ID recorded is the ID of the radio communication device A4 (104). The radio communication device A1 (101) also receives the management information A1-1, but the source device ID of the management information is its own ID, and therefore the device does not relay the management information and discards it. Instead, since the radio communication device A1 (101) continues detecting beacons from the radio communication device B1 (1201), the device generates anew management information A1-0 of the management information type "0". Then, the radio communication device A1 (101) transmits a beacon to which the management information A1-0, A4-2 are added in its slot (step S1403).

Next, the radio communication device A2 (102) receives the beacon from the radio communication device A1 (101) and generates management information A1-1 of the management information type "1" and management information A4-2 for relaying the management information A1-0, A4-2. Then, the radio communication device A2 (102) transmits a beacon to which the management information A1-1, A4-2 are added in its slot (step S1404). At this time, the radio communication device A2 (102) deletes management information in the reception beacon information table of the management information type "1" where the source device ID recorded is the ID of the radio communication device A4 (104) in the same way as the radio communication device A1 (101).

Next, the radio communication device A4 (104) receives the beacon from the radio communication device A2 (102) and generates management information A1-1 of the management information type "1" for relaying the management information A1-1 which is added to the beacon. The radio communication device A4 (104) receives the management information A4-2, but the source device ID of the management information is its own ID, and therefore the device does not relay the management information and discards it. Since the radio communication device A4 (104) does not detect a beacon from the radio communication device C1 (1202), the device does not generate further management information. Then, the radio communication device A4 (104) transmits a beacon to which the management information A1-1 is added in its slot (step S1405).

The steps from S1402 to S1405 are repeated. When the lifetime 505 of the management information of the management information type "0" where the source device ID recorded in the reception beacon information table of the radio communication device A3 (103) is the radio communication device A4 (104) becomes "0", the radio communication device A3 (103) deletes the registration of the management information. The radio communication device A3 (103) receives the beacon from the radio communication device A4 (104) and generates only management information A1-1 of the management information type "1" for relaying the management information A1-1 which is added to the beacon. Then, the radio communication device A3 (103) transmits the beacon to which the management information A1-1 is added in its slot in the next super frame cycle (step S1406).

Next, the radio communication device A1 (101) receives the management information A1-1 from the radio communication device A3 (103), but the source device ID of the management information is its own ID, and therefore the device does not relay the management information and discards it. Instead, since the radio communication device A1 (101) continues detecting beacons from the radio communication device B1 (1201), the device generates anew management information A1-0 of the management information type "0". Then, the radio communication device A1 (101) transmits a beacon to which the management information A1-1 is added in its slot (step S1407).

Next, the radio communication device A2 (102) receives the beacon from the radio communication device A1 (101) and generate management information A1-1 of the management information type "1" for relaying the management information A1-0. Then, the radio communication device A2 (102) transmits a beacon to which the management information A1-1 is added in its slot (step S1408).

Next, the radio communication device A4 (104) also transmits a beacon to which the management information A1-1 is added in its slot in the same way as the radio communication device A2 (102) (step S1409).

The above are operations conducted upon the exit of the radio communication device C1 (1202) of another beacon group, which had entered into the mutual communication area of the radio communication device A1 (101) to the radio communication device A4 (104), which are in the same beacon group.

Accordingly, all radio communication devices in the same beacon group can know that the radio communication device of another beacon group has existed.

In the above example, the radio communication device A3 (103) recognizes that management information A4-0 from the radio communication device A4 (104) is not received and judges that the radio communication device C1 (1202) has exited, and then generates management information A4-2. However, the method is not limited to this, and it is also possible that the radio communication device A4 (104) generates management information A4-2 of the management information type "2" indicating collision cancellation of the beacon when it does not detect a beacon from the radio communication device C1 (1202) for a predetermined period of time.

Figure 15:
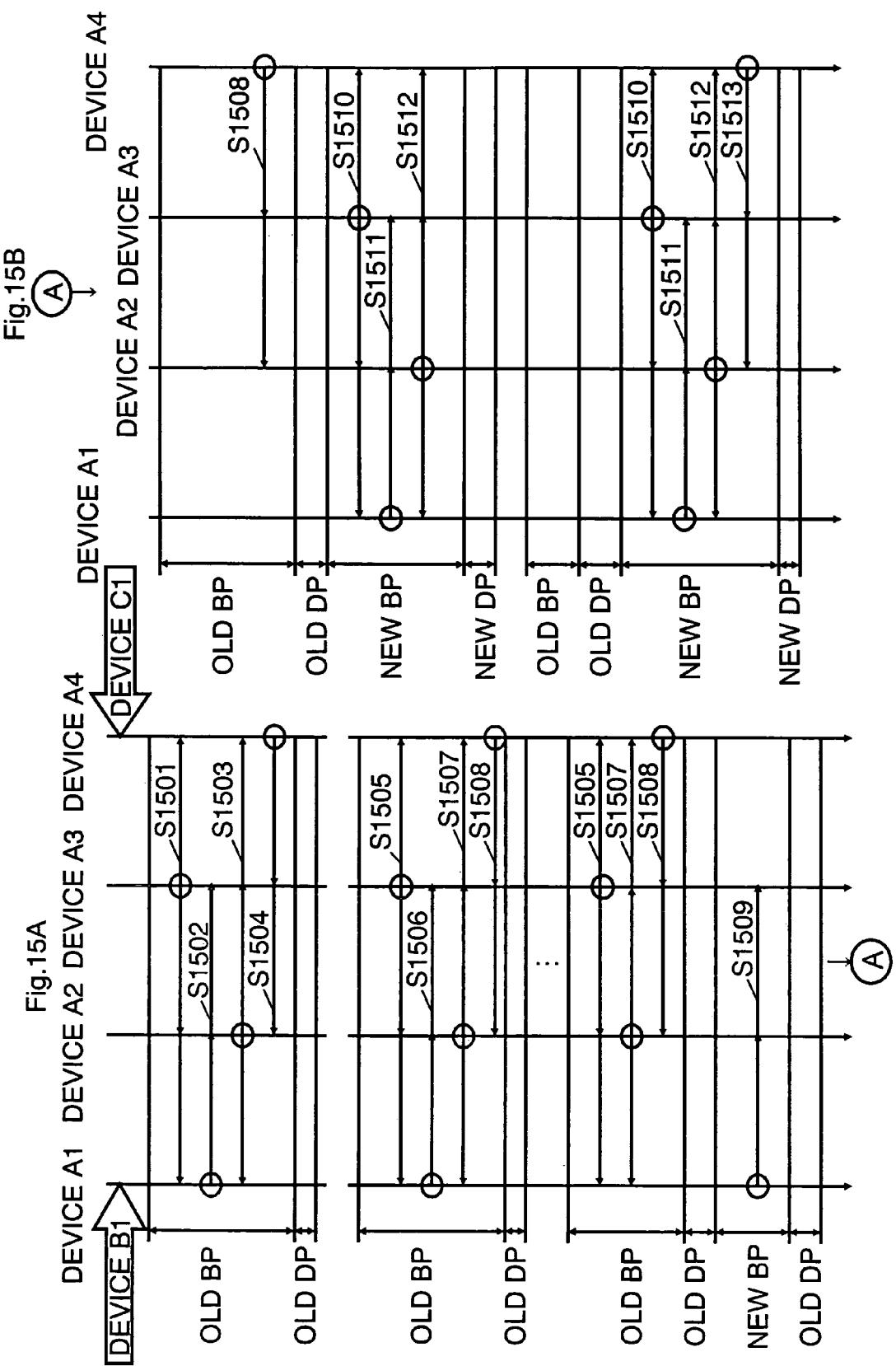
FIG. 15A is a diagram showing BP movement processing performed by radio communication devices when the beacon collision occurs according to the embodiment 1 of the invention.
FIG. 15B is a diagram showing BP movement processing performed by radio communication devices when the beacon collision occurs according to the embodiment 1 of the invention.

FIGS. 15A and 15B are sequence diagrams showing operations when the "BP" of the radio communication device B1 overlaps with the "BP" of the beacon group of the radio communication devices A1 to A3, and the "BP" of the radio communication device C1 does not overlap. The sequence shown by FIG. 15B follows the sequence shown by FIG. 15A. FIGS. 15A and 15B differ from the sequence diagram shown in FIG. 13 in that management information of the management information type "3" indicating the movement of the "BP" is given from the radio communication device A1 (101), and that the radio communication devices A1 (101) to A4 (104) move to a new "BP".

First, in order to communicate with the radio communication device A1 (101), A2 (102) and A4 (104) in the communicable area 113, the radio communication device A3 (103) transmits a normal beacon not including management information from a non-directional antenna in its slot in the beacon transmission period "BP" (step S1501).

Next, the radio communication device A1 (101) detects the beacon from the radio communication device B1 (1201), and therefore generates management information A1-0 of the management information type "0". At this time, the radio communication device A1 (101) detects that the "BP" of the radio communication device B1 (1201) overlaps with its own "BP" partially. The radio communication device A1 (101) finds the time slot where the "BP" will move and generates management information A1-3 of the management information type "3" for instructing the movement to the movement destination "BP". Then, the radio communication device A1 (101) transmits a beacon to which management information A1-0, A1-3 are added in its slot (step S1502).

Next, the radio communication device A2 (102) receives the beacon from the radio communication device A1 (101) and generates management information A1-1 of the management information type "1" and management information A1-3 for relaying the management information A1-0, A1-3. Then, the radio communication device A2 (102) transmits a beacon to which the management information A1-1, A1-3 are added in its slot (step S1503).

Next, the radio communication device A4 (104) receives the beacon from the radio communication device A2 (102) and generates management information A1-1 of the management information type "1" and a management information A1-3 for relaying the management information A1-1 which is added to the beacon. The radio communication device A4 (104) detects the beacon from the radio communication device C1 (1202), and therefore generates management information A4-0 of the management information type "0", in which the detection is written. At this time, since the "BP" does not overlap, management information for instructing the movement to a new "BP" is not generated. Then, the radio communication device A4 (104) transmits a beacon to which the management information A1-1, A1-3 and A4-0 are added in its slot (step S1504).

Next, the radio communication device A3 (103) receives the beacon from the radio communication device A4 (104) and generates management information A1-1, A4-1 of the management information type "1" and management information A1-3 for relaying the management information A1-1, A1-3 and A4-0, which are added to the beacon. Then, the radio communication device A3 (103) transmits a beacon to which the management information A1-1, A1-3 and A4-1 are added in its slot in the next super frame cycle (step S1505).

Next, the radio communication device A1 (101) receives the beacon from the radio communication device A3 (103) and generates management information A4-1 of the management information type "1" for relaying the management information A4-1 which is added to the beacon. The radio communication device A1 (101) also receives the management information A1-1, but the source device ID of the management information is its own ID, and therefore the device does not relay the management information and discards it. Alternatively, the radio communication device A1 (101) continues detecting beacons from the radio communication device B1 (102), and therefore generates anew management information A1-0 of the management information type "0".

The radio communication device A1 (101) receives management information of the management information type "3" indicating that the source device ID 312 is its own ID, and therefore checks whether the TTL 317 is "0" or not. At present, since the time is not "0", the radio communication device A1 (101) does not switch the "BP" and confirms that the "BP" does not overlap with the "BP" of the management information A4-1 newly given. If the "BP" does not overlap, the radio communication device A1 (101) generates management information A1-3 in which "1" is subtracted from the TTL 317 of the received management information A1-3. When the "BP" overlaps with the "BP" of the management information A4-1, the radio communication device A1 (101) finds a "BP" at a time slot in which the "BP" of the radio communication device B1 (1201) and the "BP" of the radio communication device C1 (1202) are avoided, and generates new management information A1-3. Then, the radio communication device A1 (101) transmits a beacon to which these management information A1-0, A1-3 and A4-1 are added in its slot (step S1506).

Next, the radio communication device A2 (102) receives the beacon from the radio communication device A1 (101) and generates management information A1-1 of the management information type "1" and management information A1-3, A4-1, subtracting "1" from the TTL of each management information item, for relaying this management information A1-0, A1-3 and A4-1. Then, the radio communication device A2 (102) transmits a beacon to which these management information items A1-1, A1-3 and A4-1 are added in its slot (step S1507).

Next, the radio communication device A4 (104) receives the beacon from the radio communication device A1 (102) and generates management information A1-1 and A1-3 of the management information type "1", subtracting "1" from the TTL of each management information item for relaying these management information A1-1, A1-3 which are added to the beacon. The radio communication device A4 (104) receives the management information A4-1, however, the source device ID of the management information is its own ID, and therefore the device does not relay the management information and discards it. Alternatively, the radio communication device A4 (104) continues detecting beacons from the radio communication device C1 (1202), and therefore generates anew management information A4-0 of the management information type "0". Then, the radio communication device A4 (104) transmits a beacon to which the management information A1-1, A1-3 and A4-0 are added in its slot (step S1508).

After the steps S1505 to S1508 are repeated three times, the radio communication device A1 (101) performs registration for switching the "BP" and stops transmitting beacons.

After that, the radio communication device A1 (101) transmits a beacon in its slot in a new "BP". The management information added at this time is for the relay of the management information A4-1 which has been given by the radio communication device A4 (104) and management information A1-0 which is generated by the radio communication device A1. After the movement to the new "BP", the "BP" does not overlap with the "BP"s of the radio communication device B1 (1201) and the radio communication device C1 (1202), and therefore management information of the management information type "3" is not added (step S1509).

At this time, the radio communication device A2 (102) and the radio communication device A3 (103) detect the beacon from the radio communication device A1 (101) and perform registration for moving the "BP" to a new time slot so as to correspond to the reception timing of the received beacon. As a result, the radio communication device A2 (102) and the radio communication device A3 (103) stop transmitting beacons in their slots in the old "BP". The radio communication device A4 (104) cannot detect a beacon from the radio communication device A1 (101), and therefore the movement of the "BP" is not performed at this time. The radio communication device A4 (104) transmits a beacon in its slot in the previous "BP" (step S1508).

Next, the radio communication device A3 (103) transmits a beacon in its slot in the new "BP". Management information to be added at this time is the management information A1-1, A4-1 for relaying the management information A1-1, A4-0 which has been received before the movement of the "BP".

At this time, the radio communication device A4 (104) detects the beacon from the radio communication device A3 (103) and performs registration for moving the "BP" to a new time slot so as to correspond to the reception timing of the received beacon. As the result, the radio communication device A4 (104) stops transmitting beacons in its slot in the old "BP".

Next, the radio communication device A1 (101) receives the beacon from the radio communication device A3 (103) and generates management information A4-1 of the management information type "1" for relaying the management information A4-1 which is added to the beacon. The radio communication device A1 (101) also receives the management information A1-1, but the source device ID of the management information is its own ID, so the device does not relay the management information and discards it. Instead, when the radio communication device A1 (101) continues detecting beacons from the radio communication device B1 (1201), the device generates new management information A1-0 of the management information type "0". Then, the radio communication device A1 (101) transmits a beacon to which this management information A1-0, A4-1 is added in its slot (step S1511).

Next, the radio communication device A2 (102) receives the beacon from the radio communication device A1 (101) and generates management information A1-1, A4-1 of the management information type "1", subtracting "1" from the TTL of each management information item, for relaying the management information A1-0, A4-1. Then, the radio communication device A2 (102) transmits a beacon to which the management information A1-1, A4-1 are added in its slot (step S1512).

In the next super frame cycle, after steps from S1510 to S1512 are processed similarly, the radio communication device A4 (104) receives the beacon from the radio communication device A2 (102). The radio communication device A4 (104) generates management information A1-1 in which "1" is subtracted from the TTL, for relaying the management information A1-1 which is added to the beacon. The radio communication device A4 (104) also receives the management information A4-1, but the source device ID of the management information is its own ID, and therefore the device does not relay the management information and discards it. Instead, the radio communication device A4 (104) continues detecting beacons from the radio communication device C1 (1202), and therefore generates anew management information A4-0 of the management information type "0". Then, the radio communication device A4 (104) transmits a beacon to which management information A1-1, A4-0 is added in its slot (step S1513).

The above are operations when the radio communication device B1 (1201) of another beacon group in which a part of the "BP" overlaps, and the radio communication device C1 (1202) of another beacon group with which the "BP" does not overlap enter into the mutual communication area of the radio communication devices A1 (101) to A4 (104), which are in the same beacon group.

Accordingly, when any radio communication device in a certain beacon group detects that a radio communication device of another beacon group in which a part of the "BP" overlaps enters, the radio communication device can notify all radio communication devices in the same beacon group of this. Thus, all the radio communication devices of the beacon group into the area of which an outside device has entered can move to a new "BP" which does not overlap.

The switching timing to the new "BP" by the radio communication device A1 (101) is set after the steps of S1505 to S1508 are repeated three times, but the number of repeating times can be decided appropriately according to the network size.

Alternatively, the switching timing to the new "BP" by the radio communication device A1 (101) can be set to be when the radio communication device A1 (101) confirms that the beacon from the surrounding radio communication devices A2 (102) and A3 (103) includes management information of the management information type "3" in which the source device ID is the ID of radio communication device A1 (101).

In the above example, the radio communication device A2 (102) and the radio communication device A3 (103) detect the beacon from the radio communication device A1 (101) after the movement and perform registration for moving the "BP" to the new time slot so as to correspond to the reception timing of the received beacon. However, operation is not limited to this, and it is possible that respective radio communication devices perform registration for moving the "BP" at an arbitrary timing after detecting the beacon.

After the movement to the new "BP", each radio communication device confirms that the beacon of the radio communication device with which the device itself intends to communicate has also moved to the new "BP", and then starts communication again. In this manner, the device can be prevented from being in a communication-disabled state because the data communication timing is delayed during the movement of the "BP".

Furthermore, it is also possible that network IDs are assigned to respective radio networks and the network IDs are included in beacons. In this manner, when both the radio communication device A1 (101) and the radio communication device B1 (1201) intend to move "BP"s, it is possible that the device having the larger network ID moves its "BP" and the device having the smaller ID does not move its "BP", and as a result the inconvenience that both radio networks move at the same time and their "BP"s overlap again can be prevented.

Figure 16:
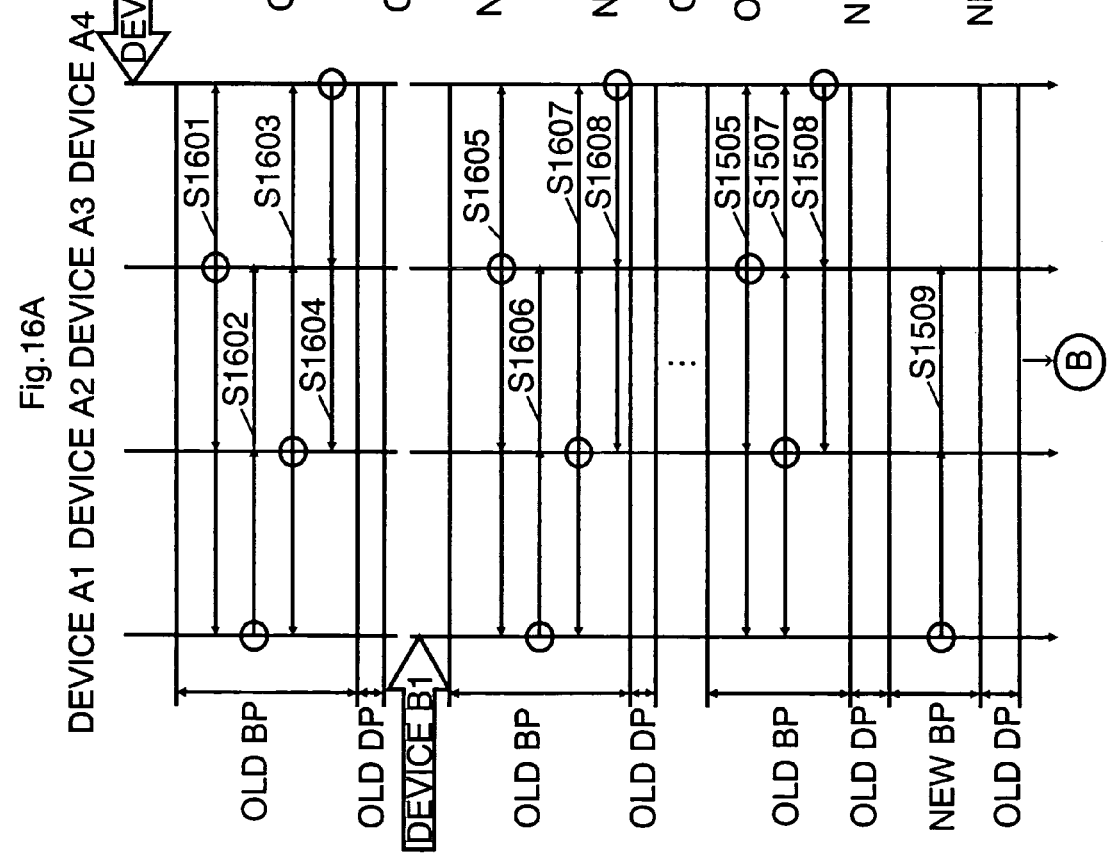
FIG. 16A is a diagram showing BP movement processing performed by radio communication devices when the beacon collision occurs according to the embodiment 1 of the invention.
FIG. 16B is a diagram showing BP movement processing performed by radio communication devices when the beacon collision occurs according to the embodiment 1 of the invention.
Figure 17:
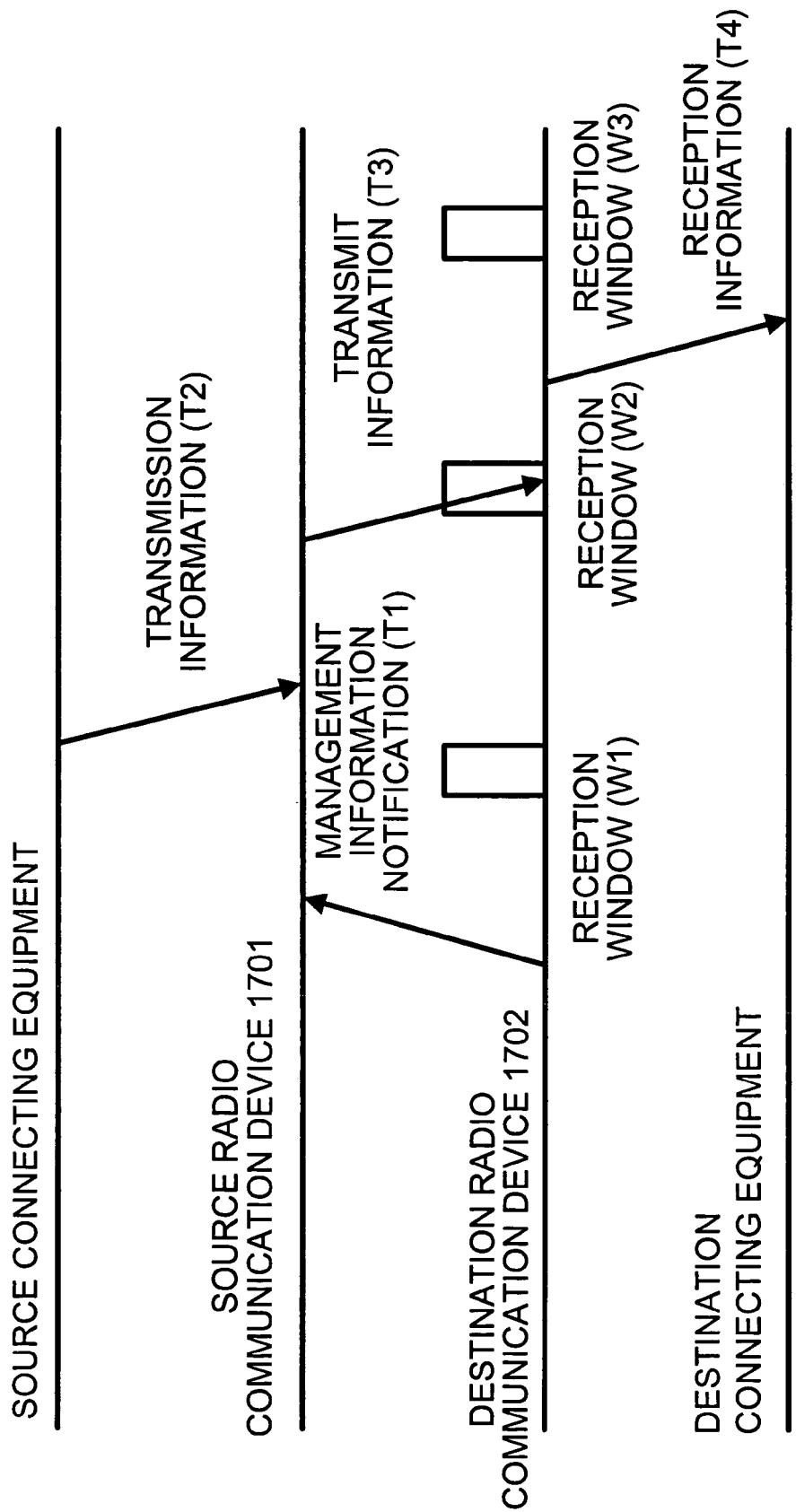
FIG. 17 is a diagram showing a radio communication method according to a prior example.
Figure 18:
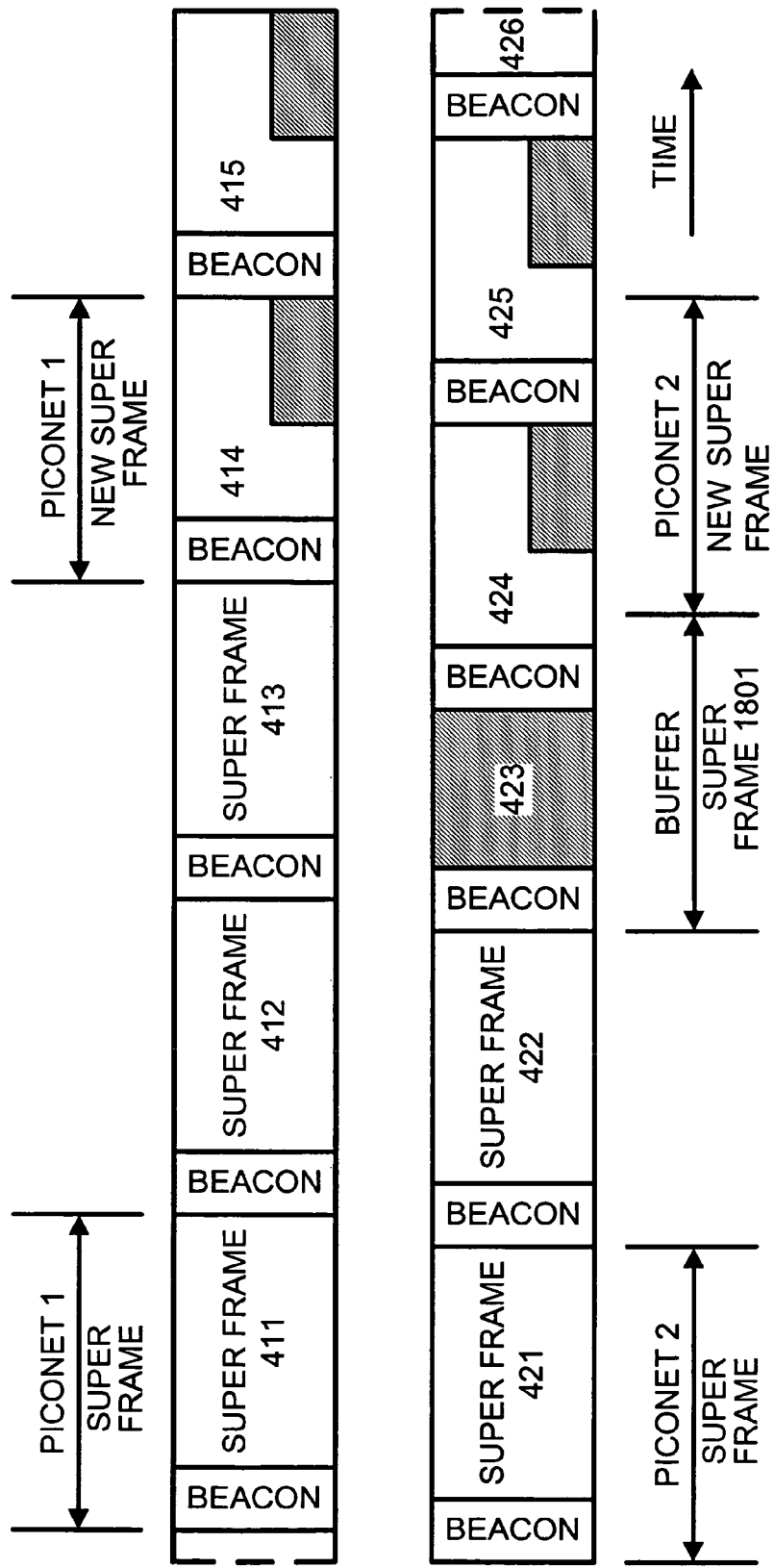
FIG. 18 is a diagram showing a radio communication method according to a prior example.

FIGS. 16A and 16B are sequence diagrams showing operations when the "BP"s of the radio communication device B1 and the radio communication device C1 both overlap with the "BP" of the beacon group of the radio communication devices A1 to A3. The sequence shown in FIG. 16B follows the sequence shown in FIG. 16A. FIGS. 16A and 16B differ from the sequence diagrams shown in FIG. 15 in that management information of the beacon type "3" instructing the movement of the "BP" is sent from the radio communication device A1 (101) and the radio communication device A4 (104), and the notification from the radio communication device A1 (101) whose device ID is smaller takes precedence.

First, the radio communication device A3 (103) transmits a normal beacon not including management information in the area 113 to the radio communication devices A1 (101), A2 (102) and A4 (104) in the communicable area 113 (step S1601).

Next, when the radio communication device A1 (101) receives the beacon from the radio communication device A3 (103), management information to be relayed is not included in the beacon and the device has not detected a beacon from the radio communication device B1 (1201) yet. Accordingly, the radio communication device A1 (101) transmits a normal beacon not including management information in its slot (step S1602).

Next, the radio communication device A2 (102) also transmits a normal beacon not including management information in its slot similarly (step S1603).

Next, when the radio communication device A4 (104) receives the beacon from the radio communication device A2 (102), it detects the beacon from the radio communication device C1 (1201), and therefore generates management information A4-0 of the beacon type "0". At this time, the radio communication device A4 (104) detects that a "BP" of the radio communication device C1 (1202) overlaps with its "BP" partially, finds the time slot where the "BP" will move and generates management information A4-3 of the beacon type "3" instructing the movement of the "BP" to the new time slot. Then, the radio communication device A4 (104) transmits a beacon to which this management information A4-0, A4-3 is added in its slot (step S1604).

Next, the radio communication device A3 (103) receives the beacon from the radio communication device A4 (104) and generates management information A4-1 of the beacon type "1" and management information A4-3 for relaying the management information A4-0, A4-3 which are added to the beacon. Then, the radio communication device A3 (103) transmits a beacon to which the management information A4-1, A4-3 are added in its slot in the next super frame cycle (step S1605).

Next, the radio communication device A1 (101) receives the beacon from the radio communication device A3 (103) and generates management information A4-1 of the beacon type "1" for relaying the management information A4-1 which is added to the beacon. The radio communication device A1 (101) also receives the management information A4-3, but the device detects that the "BP" of the radio communication device B1 (1201) overlaps with its "BP", and finds a time slot where the "BP" will move. At this time, the radio communication device A1 (101) judges that it is entitled to decide a new beacon transmission period because its device ID is smaller than that of the radio communication device A3 (103), and generates management information A1-3 of the beacon type "3" instructing the movement of the "BP" to the new time slot. The radio communication device A1 (101) does not relay the management information A4-3 and generates anew management information A1-0 of the beacon type "0". Then, the radio communication device A1 (101) transmits a beacon, to which the management information A1-0, A1-3 and A4-1 are added, in its slot (step S1606).

Next, the radio communication device A2 (102) receives the beacon from the radio communication device A1 (101) and generates management information A1-1, A4-1 of the beacon type "1" and management information A1-3, subtracting "1" from the TTL of each management information item, for relaying the management information A1-0, A1-3 and A4-1. Then, the radio communication device A2 (102) transmits a beacon, to which the management information A1-1, A1-3 and A4-1 are added, in its slot (step S1607).

Next, the radio communication device A4 (104) receives the beacon from the radio communication device A2 (102) and generates management information A1-1 and A1-3 of the beacon type "1", subtracting "1" from the TTL of each management information item, for relaying the management information A1-1, A1-3 which are added to the beacon. The radio communication device A4 (104) also receives the management information A4-1. However, the source device ID of the management information is the ID of radio communication device A4 (104), and therefore the device does not relay the management information and discards it. Instead, the radio communication device A4 (104) continues detecting beacons from the radio communication device C1 (1202), and therefore generates anew management information A4-0 of the beacon type "0". However, the radio communication device A4 (104) does not find the beacon transmission period where it will move because the device ID thereof is larger than the one of the radio communication device A1 (101). The radio communication device A4 (104) transmits the beacon, to which the management information A1-1, A1-3 and A4-0 is added, in its slot (step S1608).

After the steps from S1605 to S1608 are repeated three times, the radio communication device A1 (101) performs registration for switching the "BP" and stops transmitting beacons.

At this time, when the radio communication device A2 (102) and the radio communication device A3 (103) receive management information of the beacon type "3" in which the TTL is "0", the devices do not change the "BP" because the source device IDs are not the IDs of these devices, and they transmit beacons in their slots without any change (step S1507, step S1508).

After that, the radio communication device A1 (101) transmits beacons in its slot in a new "BP". Management information to be added at this time is for the relay of the management information A4-1 which has been provided from the radio communication device A4 (104) and management information A1-0 which the radio communication device A1 generated. After the movement to the new "BP", the "BP" does not overlap with "BP"s of the radio communication device B1 (1201) and the radio communication device C1 (1202), and therefore management information of the management information type "3" is not added (step S1509).

Operations from that time are the same as operations from steps from S1508 to S1513 shown in FIGS. 15A and 15B.

The above are operations when the radio communication device B1 (1201) and the radio communication device C1 (1202) belonging to other beacon groups enter into the mutual communication area of the radio communication devices A1 (101) to A4 (104) in the same beacon group, and parts of the "BP"s overlap.

Accordingly, when some plural radio communication devices of the same beacon group detect that the radio communication devices of other beacon groups have entered and parts of the "BP"s overlap, the devices can uniquely decide on a "BP" in which the "BP"s of the devices which have entered are avoided. Therefore, all radio communication devices in the same beacon group can know of a new "BP" for all of them. In this manner, all of them can move to a new "BP" which does not overlap.

The switching timing of the radio communication device A1 (101) to the new "BP" is set to be after the steps from S1605 to S1608 are repeated three times, but the number of repeating times can be decided appropriately according to the network size.

The radio communication device A1 (101) can switch the "BP" to a new "BP" when confirming that management information of the management information type "3" in which the source device ID is the same as the ID of radio communication device A1 (101) is included in beacons from the surrounding radio communication devices A2 (102) and A3 (103).

Furthermore, when the radio communication device A1 (101) detects that the other beacon group whose "BP" partially overlaps has left before switching to the new "BP", it can cancel the switching of the "BP" by transmitting a beacon including management information of the management information type "4".

In this case, the radio communication devices A2 (102) and A3 (103) which have received the beacon including the management information of the management information type "4" make comparison of the TTLs when the source device ID of the beacon is the same as the source device ID of the management information type "3" which has already been received. In the case where the TTL of the management information of type "4" is larger, the radio communication devices A2 (102) and A3 (103) delete the record concerning the management information type "3" and relay the management information type "4".

As described above, according to the invention, even when radio communication devices in the radio network transmit respective beacons, all the radio communication devices in the same beacon group move the beacon transmission period to a time slot not overlapping with beacon transmission periods of other beacon groups, and thus it is possible to avoid collisions with beacons from radio communication devices from other radio networks.

INDUSTRIAL APPLICABILITY

The invention is useful as a radio communication method and a radio communication device performing ad hoc communication and the like, and is suitable for avoiding collisions with beacons from radio communication devices of other radio networks in the case where radio communication devices of a radio network transmit respective beacons.

The invention claimed is:

1. A radio communication method comprising:
   a step in which when a first radio communication device detects a beacon of another network in a beacon transmission period used in a network to which the device belongs, the first radio communication device transmits a beacon performing a collision notification which gives notice of a collision of the detected beacon and gives notice that the beacon transmission period is moved to a new beacon transmission period excluding the detected beacon of the other network;
   a step in which when a second radio communication device which belongs to the same network as the first radio communication device receives the collision notification from the first radio communication device, the second radio communication device relays and transmits the collision notification;
   a step in which when a third radio communication device which belongs to the same network as the first radio communication device and the second radio communication device receives a collision notification from the second radio communication device, the third radio communication device also relays and transmits the collision notification;
   a step in which the first radio communication device transmits a beacon after moving in the new beacon transmission period;
   a step in which when the second radio communication device receives the beacon from the first radio communication device, the second radio communication device transmits a beacon in the new beacon transmission period; and
   a step in which when the third radio communication device receives the beacon from the second radio communication device, transmits a beacon in the new beacon transmission period.

2. The radio communication method according to claim 1, wherein the first radio communication device also includes a lifetime of the notification in the collision notification and transmits a beacon at the new beacon transmission period within the lifetime, and
   wherein the second radio communication device and the third radio communication device stop relaying the collision notification when the notified lifetime has expired.

3. The radio communication method according to claim 2, wherein the first radio communication device also includes a device ID for identifying itself in the collision notification, and
   wherein when the second radio communication device and the third radio communication device receive collision notifications whose device IDs are the same, they give preference to the notification whose lifetime is larger.

4. The radio communication method according to claim 3, wherein when the second radio communication device and the third radio communication device receive collision notifications whose device IDs are different, they give precedence to the collision notification having either the maximum device ID or the minimum device ID among the device IDs, which are previously prescribed in their network.

5. The radio communication method according to claim 1, wherein communication is prohibited in the first radio communication device, the second radio communication device and the third radio communication device during the time from transmission or reception of the collision notification until the reception of a beacon of a transmission destination radio communication device at the new beacon transmission period.

6. The radio communication method according to claim 1, also comprising:
   a step in which the first radio communication device transmits a beacon for performing a collision cancellation notification which gives notice that the beacon collision has been cancelled when the device does not detect a beacon of another network throughout a predetermined period of time in the beacon transmission period of the network to which the device belongs after the collision notification; and
   a step in which when the second radio communication device and the third radio communication device receive a collision cancellation notification, they stop moving to the new beacon transmission period and relay and transmit the collision cancellation notification.

7. The radio communication method according to claim 6, wherein the first radio communication device also includes a lifetime of the collision cancellation notification in the collision cancellation notification, and wherein the second radio communication device and the third radio communication device end the relay when the lifetime has expired.

8. The radio communication method according to claim 7, wherein the first radio communication device also includes a device ID for identifying itself in the collision cancellation notification, and wherein when the second radio communication device and the third radio communication device receive a collision cancellation notification whose device ID is the same, they delete the setting of the lifetime which has been given by collision notification in the case where the lifetime of the collision cancellation notification is larger than the lifetime of the collision notification.

9. The radio communication method according to claim 8, wherein if after the second radio communication device and the third radio communication device receive a collision cancellation notification, they receive a collision notification whose device ID is the same, they delete the setting of the lifetime given in the collision cancellation notification in the where the lifetime of the collision notification is larger than the lifetime of the collision cancellation notification.

10. The radio communication method according to claim 1, also comprising:

a step in which when the first radio communication device detects a beacon of another network outside of the beacon transmission period used by the network to which the device belongs, it transmits a beacon for performing a beacon period notification which gives notice of the detected beacon transmission period;

a step in which when the second radio communication device receives the beacon period notification from the first radio communication device, the second radio communication device relays and transmits the beacon period notification; and a step in which when the third radio communication device receives the beacon period notification from the second radio communication device, the third radio communication device also relays and transmits the beacon period notification.

11. The radio communication method according to claim 10, wherein when the first radio communication device performs the collision notification, it deems a beacon transmission period given in the beacon period notification from another radio communication device belonging the same network is removed as the new beacon transmission period to which the first radio communication device will move.

12. The radio communication method according to claim 10, wherein the second radio communication device also includes a lifetime of the notification in the beacon period notification, and wherein the third radio communication device stops relaying the beacon period notification when the lifetime of the beacon period notification has expired.

13. The radio communication device according to claim 12, wherein the second radio communication device also includes a device ID for identifying itself in the beacon period notification, and wherein when the third radio communication device receives the beacon period notifications whose device IDs are the same, it gives precedence to the notification whose lifetime of the beacon period notification is larger, and when it receives beacon period notifications whose device IDs are different, the device gives precedence to the beacon period notification having either the maximum ID or the minimum ID among the device IDs, which were previously prescribed in its network.

14. The radio communication method according to claim 10, also comprising:

a step in which if after the second radio communication device receives the beacon period notification, it does not detect a beacon period notification throughout a predetermined period of time, it transmits a beacon for performing a beacon period discard notification for instructing the discard of the beacon period notification, and a step in which when the third radio communication device receives the beacon period discard notification, it relays and transmits the beacon period discard notification.

15. The radio communication method according to claim 14, wherein the second radio communication device also includes a lifetime of the notification in the beacon period discard notification, and wherein the third radio communication device stops relaying the beacon period discard notification when the lifetime of the beacon period discard notification has expired.

16. The radio communication method according to claim 15, wherein the second radio communication device also includes a device ID for identifying the first radio communication device in the beacon period discard notification, and wherein when the third radio communication device receives beacon period discard notifications whose device IDs are the same, it gives precedence to the notification whose lifetime of the beacon period discard notification is larger, and when it receives beacon period discard notifications whose device IDs are different, it gives precedence to the beacon period discard notification having either maximum device ID or the minimum device ID among the device IDs, which were previously prescribed in its network.

17. The radio communication method according to claim 16, wherein the third radio communication device gives precedence to the notification whose lifetime is larger when the device ID of the transmission destination of the received notification is the same.

18. The radio communication method according to claim 1, wherein the first to the third radio communication device transmit a beacon including a network ID for identifying the radio network to which the device belongs, and wherein when they receive a beacon including a beacon transmission period which overlaps with their beacon transmission period, the radio communication device having the network ID chosen according to a previously prescribed rule deciding between the two in the case where the network ID of the beacon is larger and in the case where the network ID of the beacon is smaller than its own network ID, performs the collision notification.

19. A radio communication device, comprising:
a beacon reception unit receiving a beacon and extracting a frame;
a frame judgment unit judging whether the extracted frame is one giving notice of a collision in a beacon transmission period of the radio communication device, the collision occurring with a beacon of another radio communication device of another network;
a frame constructing unit used when said frame judgment unit has judged that the frame is a collision notification, generating a collision notification frame for relaying the collision notification, the collision notification gives notice from the radio communication device to other radio devices in a group with the radio communication device to move to a new beacon transmission period; and
a beacon transmission instruction unit instructing transmission of the collision notification frame at the beacon transmission timing,
wherein the radio communication device transmits a beacon after moving to the new beacon transmission period.

20. The radio communication device according to claim 19,
wherein the collision notification frame includes information which prescribes a new beacon transmission period other than a beacon transmission period of another network as the beacon transmission period, and
wherein, when said beacon transmission instruction unit receives a beacon detection notification from its network at the new beacon transmission period through said beacon reception unit, the beacon transmission instruction unit switches the beacon transmission timing to the new beacon transmission period.

21. The radio communication device according to claim 20,
wherein the collision notification frame also includes lifetime information of the collision notification, and
wherein said frame constructing unit counts the lifetime every time it receives the beacon transmission instruction from said beacon transmission instruction unit and generates the collision notification frame until the expiration of the lifetime.

22. The radio communication device according to claim 21,
wherein the collision notification frame also includes a device ID for identifying the radio communication device which has transmitted the collision notification frame, and
wherein when said frame judgment unit receives collision notification frames whose device IDs are the same, it gives precedence to the frame whose lifetime is larger.

23. The radio communication device according to claim 22,
wherein when said frame judgment unit receives collision notifications whose device IDs are different, it gives precedence to the collision notification having either the maximum ID or the minimum ID among the device IDs, which are previously prescribed in its network.

24. The radio communication device according to claim 23,
wherein said frame constructing unit does not generate a frame of data communication from the time when said frame judgment unit transmits or receives the collision notification until said beacon reception unit receives a beacon of the transmission destination radio communication device at the new beacon transmission period.

25. The radio communication device according to claim 24, also comprising:
a recording unit recording the collision notification, and
wherein when said frame constructing unit receives a collision cancellation notification for giving notice that the collision has been cancelled from said frame judgment unit, the frame constructing unit discards the record of the collision notification and generates a frame for relaying the collision cancellation notification.

26. The radio communication device according to claim 25,
wherein the frame of the collision cancellation notification also includes lifetime information of the collision cancellation notification, and
wherein said frame constructing unit counts the lifetime every time it receives the beacon transmission instruction from said beacon transmission instruction unit, and generates the frame of the collision cancellation notification until the expiration of the lifetime.

27. The radio communication device according to claim 26,
wherein the frame of the collision cancellation notification also includes a device ID for identifying the device, and
wherein when said frame constructing unit receives a collision cancellation notification whose device ID is the same, it discards the record of the collision notification in the case where the lifetime of the collision notification is larger than the lifetime of the collision cancellation notification.

28. The radio communication device according to claim 27,
wherein when said frame constructing unit receives the collision cancellation notification, it records the collision cancellation notification in said recording unit, and when it receives the collision notification frame including the same device ID during the transmission of the frame including the collision cancellation notification in the lifetime, it discards the record of the collision cancellation notification in the case where the lifetime of the collision notification is larger than the lifetime of the collision cancellation notification.

29. The radio communication device according to claim 25,
wherein when said frame judgment unit receives information of a beacon transmission period of another network which does not overlap its own beacon transmission period, it records the beacon transmission period in said recording unit, and
wherein when said frame constructing unit detects a beacon transmission period of another network which overlaps with its own beacon transmission period, the frame constructing unit generates a collision notification frame including information which sets a new beacon transmission period from which the beacon transmission period of another network and beacon transmission periods of other networks recorded in said recording unit are removed as the beacon transmission period of its network.

* * * * *